United States Patent
Repasi et al.

(10) Patent No.: US 8,196,201 B2
(45) Date of Patent: Jun. 5, 2012

(54) DETECTING MALICIOUS ACTIVITY

(75) Inventors: Rolf Repasi, Sunrise Beach (AU);
Simon Clausen, New South Wales (AU);
Ian Oliver, New South Wales (AU);
Ryan Pereira, New South Wales (AU)

(73) Assignee: Symantec Corporation, Mountian View, CA (US)

( * ) Notice: Subject to any disclaimer, the term of this patent is extended or adjusted under 35 U.S.C. 154(b) by 1039 days.

(21) Appl. No.: 11/780,113

(22) Filed: Jul. 19, 2007

(65) Prior Publication Data

US 2008/0022407 A1    Jan. 24, 2008

Related U.S. Application Data

(60) Provisional application No. 60/831,813, filed on Jul. 19, 2006.

(51) Int. Cl.
*G06F 21/00* (2006.01)
(52) U.S. Cl. ................ 726/22; 726/23; 726/25
(58) Field of Classification Search .............. 726/22–25
See application file for complete search history.

(56) References Cited

U.S. PATENT DOCUMENTS

| | | | | |
|---|---|---|---|---|
| 5,974,549 | A * | 10/1999 | Golan | 726/23 |
| 6,973,577 | B1 * | 12/2005 | Kouznetsov | 726/25 |
| 7,877,806 | B2 * | 1/2011 | Repasi et al. | 726/23 |
| 2002/0198981 | A1 * | 12/2002 | Corl et al. | 709/224 |
| 2004/0098289 | A1 * | 5/2004 | Sugimori | 705/7 |
| 2004/0128674 | A1 * | 7/2004 | Grabarnik et al. | 719/318 |
| 2004/0199763 | A1 * | 10/2004 | Freund | 713/154 |
| 2006/0230442 | A1 * | 10/2006 | Yang | 726/11 |

OTHER PUBLICATIONS

Weidong et al. "Design and Implementation of an Extrusion-based Break-In Detector for Personal Computers", 2005, Proceedings of the 21st Annual Computer Security Applications Conference.*

* cited by examiner

*Primary Examiner* — Kambiz Zand
*Assistant Examiner* — Michael Guirguis
(74) *Attorney, Agent, or Firm* — Holland & Hart LLP

(57) ABSTRACT

A method, system, computer program product and/or computer readable medium of instructions to detect malicious activity. The method comprises intercepting an activity in a processing system, wherein a requesting entity requests the activity to be performed in relation to a target entity; determining, using a filter module if the activity is suspicious or non-suspicious; and in response to determining that the activity is suspicious, analysing at least one of the activity, the requesting entity and the target entity using an analysis module to detect malicious activity. There is also disclosed a method, system, computer program product and/or computer readable medium of instructions to facilitate the detection of malicious activity.

20 Claims, 14 Drawing Sheets

DETECTING MALICIOUS ACTIVITY

This application claims the benefit of priority from Provisional Application Ser. No. 60/831,813, filed on Jul. 19, 2006, which is hereby incorporated by reference in its entirety.

TECHNICAL FIELD

The present invention generally relates to a method, system, computer readable medium of instructions and/or computer program product for detecting malicious activity in a processing system.

BACKGROUND ART

As used herein a "threat" comprises malicious software, also known as "malware" or "pestware", which comprises software that is included or inserted in a part of a processing system or processing systems for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hook (also known as a hook procedure or hook function), as used herein, generally refers to a callback function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), as used herein as a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process, as used herein, is at least one of a running software program or other computing operation, or a part of a running software program or other computing operation, that performs a task.

A hook chain as used herein, is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

A system registry is a database used by operating systems, for example Windows™ platforms. The system registry comprises information needed to configure the operating system. The operating system refers to the registry for information ranging from user profiles, to which applications are installed on the machine, to what hardware is installed and which ports are registered.

An entity can comprise, but is not limited to, a file, an object, a class, a collection of grouped data, a library, a variable, a process, and/or a device.

The term "activity" is used herein to encompass an event which has occurred and/or an action which is to be performed.

There are currently a number of techniques which can be used to detect malicious activity in a processing system.

One technique comprises using database driven malware techniques which detect known malware. In this technique, a database is used which generally comprises a signature indicative of a particular type of malware. However, this technique suffers from a number of disadvantages. Generating and comparing signatures for each entity in a processing system to the database can be highly process-intensive task. Other applications can be substantially hampered or can even malfunction during this period of time when the detection process is performed. Furthermore, this technique can only detect known malware. If there is no signature in the database for a new type of malware, malicious activity can be performed without the detection of the new type of malware.

Another method that can be used comprises a dynamic detection technique to detect malicious activity in a processing system. In this technique particular events are recorded which are generally associated with the behaviour of malware. The recorded events are then analysed to determine whether the events are indicative of malicious activity. Thus, new types of malware can be detected if they perform behaviour which is generally considered malicious. However, this activity suffers from high inefficiency due to recording 'false positives'. For example, if the user interacts with the operating system to cause a permission of a file to change, this event could be recorded and possibly analysed, thereby wasting processing resources.

Therefore, there exists a need for a method, system, computer readable medium of instructions, and/or a computer program product which can efficiently detect malicious activity in a processing system which addresses or at least ameliorates at least one of the problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In a first broad form there is provided a method of detecting malicious activity, wherein the method comprises:

intercepting an activity in a processing system, wherein a requesting entity requests the activity to be performed in relation to a target entity;

determining, using a filter module if the activity is suspicious or non-suspicious; and in response to determining that the activity is suspicious, analysing at least one of the activity, the requesting entity and the target entity using an analysis module to detect malicious activity.

In one form, the filter module filters the activity according to the requesting entity and the target entity to determine if the activity is suspicious.

In one particular, but non-limiting form, the filter module comprises a list of susceptible target entity filter rules, wherein the step of determining if the activity is suspicious comprises determining if the target entity satisfies one of the susceptible target entity filter rules, and in response to one of the susceptible target entity filter rules being satisfied, the activity is identified as being suspicious.

In another particular, but non-limiting form, the filter module comprises a list of non-susceptible target entity filter rules, wherein the step of determining if the activity is non-suspicious comprises determining if the target entity satisfies one of the non-susceptible target entity filter rules, and in response to one of the non-susceptible target entity filter rules being satisfied, the activity is identified as being non-suspicious.

In one aspect, the filter module comprises a list of non-trusted requesting entity filter rules, wherein the step of determining if the activity is suspicious comprises determining if the requesting entity satisfies one of the non-trusted requesting entity filter rules, and in response to one of the non-trusted requesting entity filter rules being satisfied, the activity is identified as being suspicious.

In another aspect, the filter module comprises a list of trusted requesting entity filter rules, wherein the step of determining if the activity is non-suspicious comprises determining if the requesting entity satisfies one of the non-trusted requesting entity filter rules, and in response to one of the non-trusted requesting entity filter rules being satisfied, the activity is identified as being non-suspicious.

In one embodiment, the analysis module comprises a list of activity sequences indicative of malicious activity, wherein analysing the suspicious activity comprises comparing the suspicious activity and at least one of one or more activities which occurred prior to the suspicious activity and one or more activities which occurred after the suspicious activity to the list of activity sequences, wherein in response to a positive comparison, the activity is determined to be associated with malicious activity.

In particular embodiments, the filter module comprises a list of filter rules to determine if at least one of the target entity and the requesting entity are suspicious or non-suspicious, wherein the method comprises determining an order of the list based at least partially according to a frequency of instances that each filter rule has been previously satisfied, wherein the list of filter rules are used in accordance with the order.

In another embodiment, the list of susceptible entities is ordered based at least partially according to a frequency of instances each susceptible target entity filter rule has been previously satisfied.

In another embodiment, the list of non-susceptible entity rules is ordered based at least partially according to a frequency of instances each non-susceptible target entity filter rule has been previously satisfied.

In another embodiment, the list of trusted requesting entity filter rules is ordered based at least partially according to a frequency of instances each trusted requesting entity filter rule has been previously satisfied.

In another embodiment, the list of non-trusted requesting entity filter rules is ordered based at least partially according to a frequency of instances each non-trusted requesting entity filter rule has been previously satisfied.

Also optionally, in response to detecting the malicious activity, the method comprises at least one of:

informing a user of the processing system of the detection of the malicious activity;

restricting the malicious activity being performed;

prompting the user of the processing system regarding the detected malicious activity; and reporting the detection of malicious activity to a server processing system.

In a second broad form there is provided a system of detecting malicious activity, wherein the system is configured to:

intercept an activity in a processing system, wherein a requesting entity requests the activity to be performed in relation to a target entity;

determine, using a filter module if the activity is suspicious or non-suspicious; and in response to determining that the activity is suspicious, analyse at least one of the activity, the requesting entity and the target entity using an analysis module to detect malicious activity.

In a third broad form there is provided a computer program product for a processing system, the computer program product comprising a computer readable medium having a computer program recorded therein or thereon, the computer program enabling the detection of malicious activity, wherein the computer program product configures the processing system to:

intercept an activity in a processing system, wherein a requesting entity requests the activity to be performed in relation to a target entity;

determine, using a filter module if the activity is suspicious or non-suspicious; and in response to determining that the activity is suspicious, analyse at least one of the activity, the requesting entity and the target entity using an analysis module to detect malicious activity.

In a fourth broad form there is provided a method of facilitating detection of a suspicious entity in, or interacting with, a processing system, the method being performed in at least one of the processing system and a server processing system, the server processing system being in data communication with the processing system, wherein the method comprises determining an order of a list of filter rules, wherein each filter rule has an associated filter rating at least partially indicative of a frequency of instances that each filter rule has been previously satisfied in identifying suspicious or non-suspicious entities for the processing system, and wherein determining the order of the list of filter rules is performed at least partially in accordance with the filter rating for each filter rule in the list such that use of the filter rules to detect the suspicious entity is performed in accordance with the determined order.

In some forms, the method comprises generating the filter rating for each filter rule based at least partially on the frequency of instances that each filter rule has been satisfied.

In other forms, the method comprises generating the filter rating for each filter rule for over a selected period of time.

In one embodiment, the step of generating the filter rating for each filter rule comprises weighting each filter rating according to a recentness of the filter rule being satisfied.

In a fifth broad form there is provided a system to facilitate detection of a suspicious entity in, or interacting with, a processing system, the system comprising at least one of the processing system and a server processing system, the server processing system being in data communication with the processing system, wherein at least one of the processing system and the server processing system are configured to determine an order of a list of filter rules, wherein each filter rule has an associated filter rating at least partially indicative of a frequency of instances that each filter rule has been previously satisfied in identifying suspicious or non-suspicious entities for the processing system, and wherein determining the order of the list of filter rules is performed at least partially in accordance with the filter rating for each filter rule in the list such that use of the filter rules to detect the suspicious entity is performed in accordance with the determined order.

In a sixth broad form there is provided a computer program product comprising a computer readable medium having a computer program recorded therein or thereon, the computer program being configured to facilitate detection of a suspicious entity in, or interacting with, a processing system, wherein the computer program product configures at least one of:

the processing system; and a server processing system, the server processing system being in data communication with the processing system;

to determine an order of a list of filter rules, wherein each filter rule has an associated filter rating at least partially indicative of a frequency of instances that each filter rule has been previously satisfied in identifying suspicious or non-suspicious entities for the processing system, and wherein determining the ordering of the list of filter rules is performed at least partially in accordance with the filter rating for each filter rule in the list such that use of the filter rules to detect the suspicious entity is performed in accordance with the determined order.

In another broad form there is provided a method of facilitating detection of suspicious entities in, or interacting with, a processing system, wherein the method comprises, in the processing system:

determining an order of a list of filter rules, wherein each filter rule has an associated filter rating at least partially indicative of a frequency of instances that each filter rule has been previously satisfied in identifying suspicious or non-suspicious entities for the processing system, wherein determining the order of the list of filter rules is performed at least partially in accordance with the filter rating for each filter rule in the list; and using the filter rules, in accordance with the determined order, to detect a suspicious entity.

In another broad form there is provided a system to facilitate detection of a suspicious entity in, or interacting with, a processing system, wherein the system is configured to:

determine an order of a list of filter rules, wherein each filter rule has an associated filter rating at least partially indicative of a frequency of instances that each filter rule has been previously satisfied in identifying suspicious or non-suspicious entities for the processing system, and wherein determining the order of the list of filter rules is performed at least partially in accordance with the filter rating for each filter rule in the list; and use the filter rules, in accordance with the determined order, to detect the suspicious entity.

In another broad form there is provided a computer program product comprising a computer readable medium having a computer program recorded therein or thereon, the computer program being configured to facilitate detection of a suspicious entity in, or interacting with, a processing system, wherein the computer program product configures the processing system to:

determine an order of a list of filter rules, wherein each filter rule has an associated filter rating at least partially indicative of a frequency of instances that each filter rule has been previously satisfied in identifying suspicious or non-suspicious entities for the processing system, and wherein determining the order of the list of filter rules is performed at least partially in accordance with the filter rating for each filter rule in the list; and use the filter rules, in accordance with the determined order, to detect the suspicious entity.

In another broad form there is provided a method of facilitating detection of a suspicious entity in, or interacting with, a client processing system, wherein the method comprises, in a server processing system:

determining an order of a list of filter rules, wherein each filter rule has an associated filter rating at least partially indicative of a frequency of instances that each filter rule has been previously satisfied in identifying suspicious or non-suspicious entities for the client processing system, wherein determining the order of the list of filter rules is performed at least partially in accordance with the filter rating for each filter rule in the list; and transferring order data indicative of the order of the list to the client processing system, thereby allowing the client processing system to use the filter rules, in accordance with the determined order, to detect the suspicious entity.

In another broad form there is provided a system to facilitate detection of a suspicious entity in, or interacting with, a client processing system, wherein the system comprises a server processing system configured to:

determine an order a list of filter rules, wherein each filter rule has an associated filter rating at least partially indicative of a frequency of instances that each filter rule has been previously satisfied in identifying suspicious or non-suspicious entities for the client processing system, and wherein determining the ordering of the list of filter rules is performed at least partially in accordance with the filter rating for each filter rule in the list; and transfer order data indicative of the order of the list to the client processing system, thereby allowing the client processing system to use the filter rules, in accordance with the determined order, to detect the suspicious entity.

In another broad form there is provided a computer program product comprising a computer readable medium having a computer program recorded therein or thereon, the computer program being configured to facilitate detection of a suspicious entity in, or interacting with, a client processing system, wherein the computer program product configures a server processing system to:

determine an order a list of filter rules, wherein each filter rule has an associated filter rating at least partially indicative of a frequency of instances that each filter rule has been previously satisfied in identifying suspicious or non-suspicious entities for the client processing system, and wherein determining the ordering of the list of filter rules is performed at least partially in accordance with the filter rating for each filter rule in the list; and transfer order data indicative of the order of the list to the client processing system, thereby allowing the client processing system to use the filter rules, in accordance with the determined order, to detect the suspicious entity.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
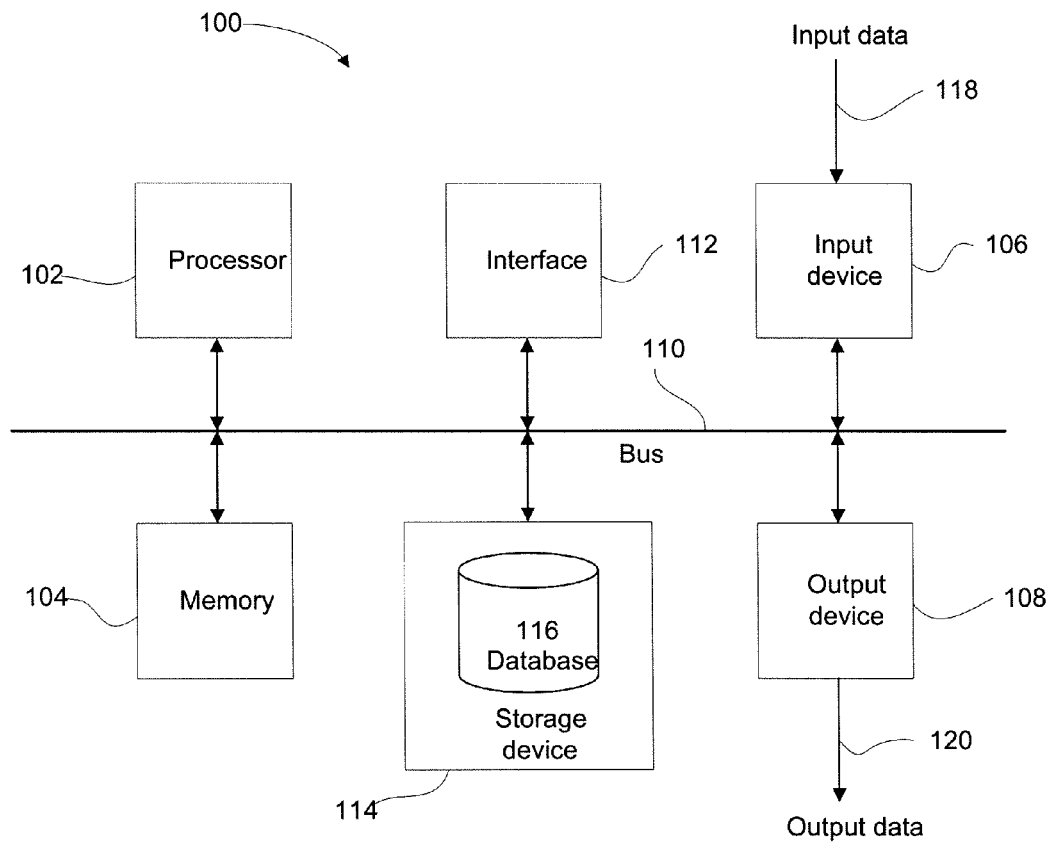
FIG. 1 illustrates a functional block diagram of an example of a processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1. The processing system 100 illustrated in relation to FIG. 1 can be used as a client processing system 810 and/or a server processing system 840.

In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

The processing system 100 may be a part of a networked communications system. The processing system 100 could connect to network, for example the Internet or a WAN. The network can comprise one or more client processing systems 810 and one or more server processing systems 840 (refer to FIG. 8), wherein the one or more client processing systems 810 and the one or more server processing systems 840 are forms of processing system 100. Input data 118 and output data 120 could be communicated to other devices via the network. The transfer of information and/or data over the network can be achieved using wired communications means or wireless communications means. The server processing system 840 can facilitate the transfer of data between the network and one or more databases. The server processing system 840 and one or more databases provide an example of an information source.

Figure 2:
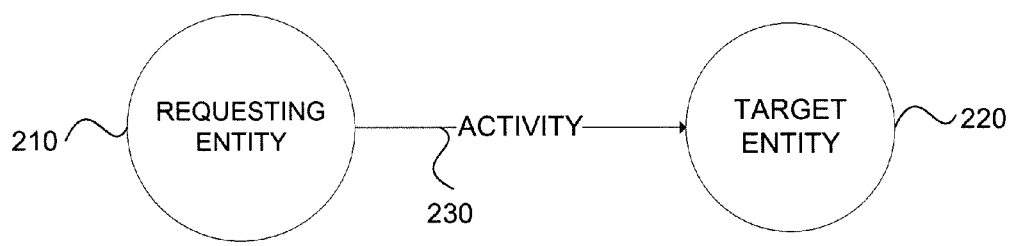
FIG. 2 illustrates a block diagram illustrating the relationship between a requesting entity and a target entity.

Referring to FIG. 2, there is shown a block diagram illustrating the relationship between a requesting entity 210 and a target entity 220. In particular, the requesting entity 210 causes an activity 230 to be performed in relation to a target entity 220. For example, an executable object in a client processing system 810 may request to download data from a web-site on the Internet. In this example, the executable object would be considered the requesting entity 210, the activity 230 would be considered the action of downloading data, and the target entity 220 would be the web-site on the Internet. The requesting entity 210 is a starting point in the processing system 810, or network of processing systems 100, which requests the activity 230 to be performed, and the target entity 220 is an end point in the processing system 100, or network of processing systems 100, which the activity 230 occurs in relation to.

Figure 3:
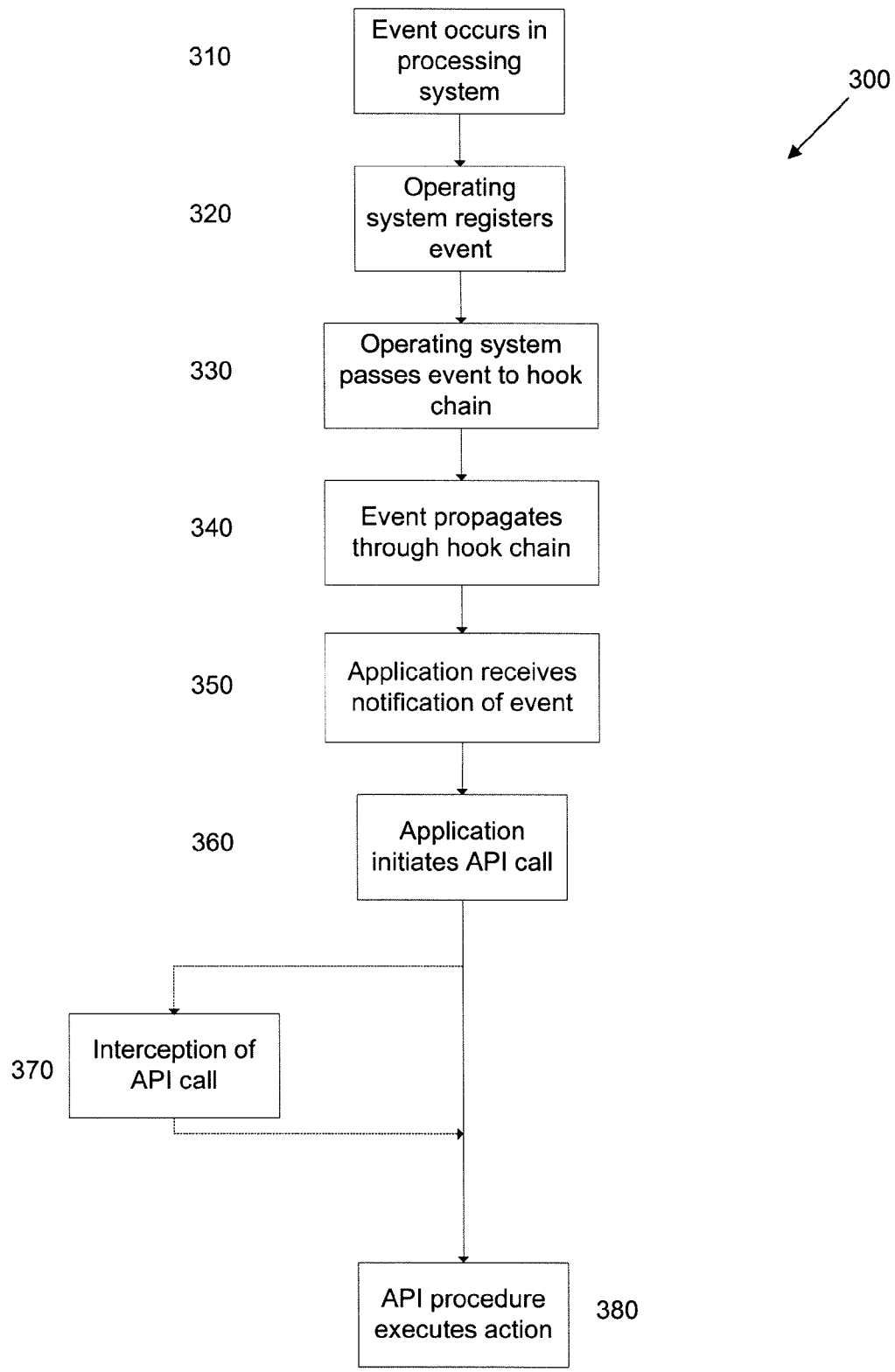
FIG. 3 illustrates a flow diagram of an example method of intercepting an activity in a processing system.

Referring to FIG. 3 there is shown an example of a method 300 of intercepting an activity in a processing system 100.

At step 310, an event occurs in the processing system 100. The event can be a request by a requesting entity 210 to perform an action 230 in relation to a target entity 220. At step 320, an operating system running in the processing system 100 registers the occurrence of the event. At step 330, the operating system passes the registered event to the hook chain. At step 340, the event is passed to each hook in the hook chain such that different applications, processes, and devices may be notified of the registered event. Once the event has propagated throughout the hook chain, the method 300 comprises at step 350 an application receiving notification of the event being registered by the processing system 100.

At step 360, the method 300 comprises the application initiating an API call to an API procedure so as to carry out a response to the registered event, wherein the response may be the execution of the action 230 in relation to the target entity 220. If an API hook has been established between the API call and the API procedure, the API call is intercepted before it reaches the API procedure at step 370. Processing can be performed once the API call has been intercepted prior to the API procedure being called. The API call may be allowed to continue calling the API procedure at step 380 such that the action 230 is performed in relation to the target entity 220.

Figure 4:
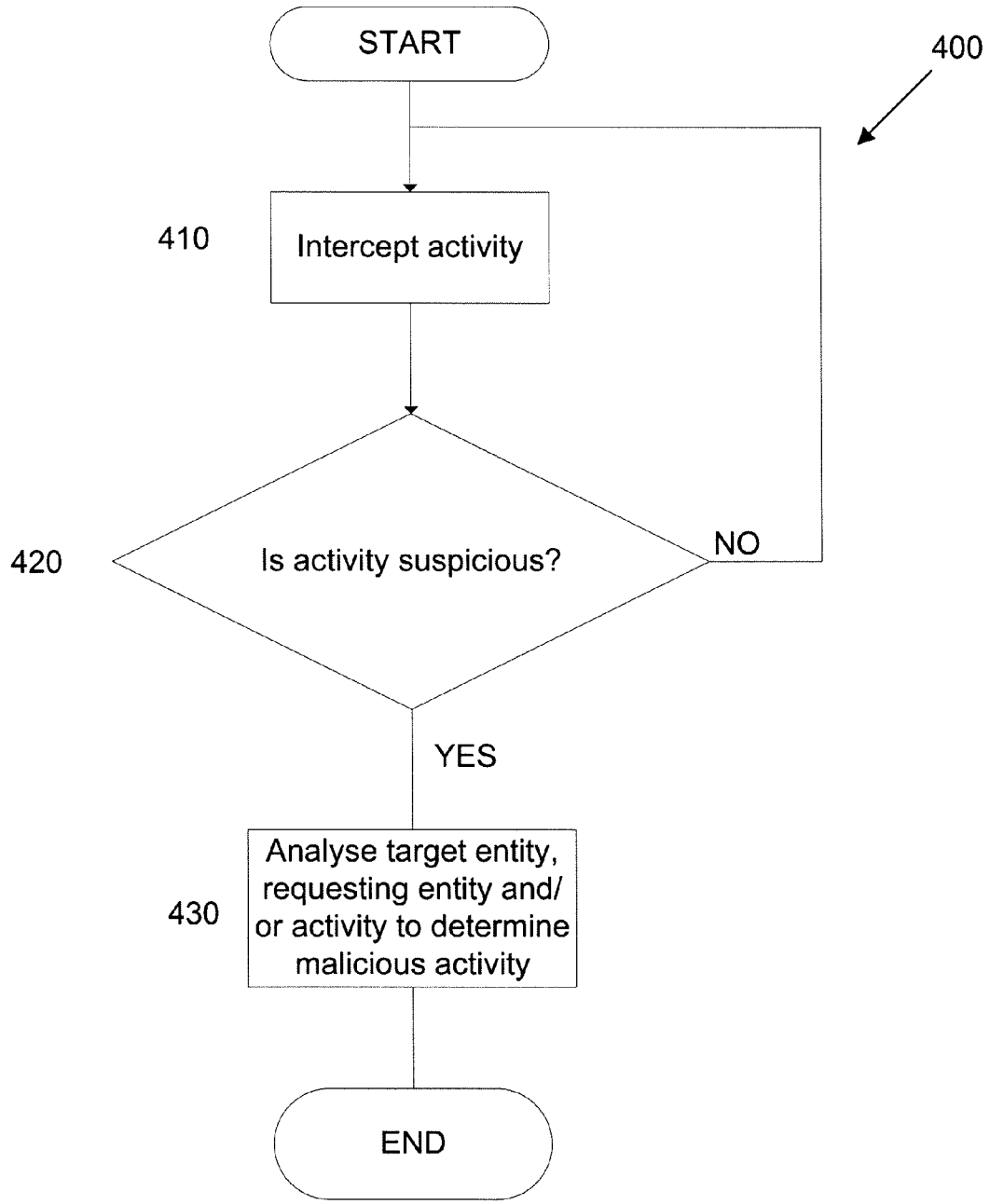
FIG. 4 illustrates a flow diagram of an example method of detecting malicious activity.

Referring to FIG. 4, there is shown a method 400 of detecting malicious activity. At step 410 the method 400 comprises intercepting an activity 230 in the processing system 100, wherein the requesting entity 210 requests the activity 230 to be performed in relation to the target entity 220. At step 420 the method 400 comprises determining, using a filter module 1000, if the activity is suspicious or non-suspicious. If the activity 230 is determined to be suspicious, the method 400 proceeds to step 430 where the method 400 comprises analysing at least one of the activity 230, the requesting entity 210 and the target entity 220 using an analysis module 1200 to detect malicious activity.

In one form, the filter module filters the intercepted activity based on at least one of the requesting entity 210 and the target entity 220 of the activity 230 to determine if the activity 230 is suspicious or non-suspicious.

By using the filter module 1000, the number of false positives which subsequently require analysis are reduced. For example, if the filter module 1000 filters out system calls caused by the user interacting with the processing system 100, then such non-suspicious activities are not analysed, thereby reducing the amount of analysis to be performed. Furthermore, by filtering the activity based on the target entity 220 and/or the requesting entity 210 using the filter module 1000, a more accurate filtering process can be performed. As will be further described, the order in which the filtering is performed by the filter module 1000 can also substantially reduce the amount of processing performed when determining if an activity 230 is suspicious.

To further illustrate the advantages of using the filter module 1000, the following example is provided. An activity 230 of transferring data over a network may be monitored as an activity 230 of interest in the processing system 100 as this activity is commonly associated with malware. Throughout a particular period of time, the processing system 100 may record one-hundred instances when the processing system 100 transferred data over the network. A large number of these instances are likely to be non-suspicious activities 230, such as a user requesting to transfer data over the network. Performing an analysis of one-hundred activities 230 which are likely to not be suspicious can waste valuable processing and storage resources. However, by filtering the activities 230 based on the target entity 220 and/or the requesting entity 210, suspicious activities 230 which require analysis can be determined, thereby substantially reducing the number of activities 230 which require analysis to determine if malicious activity is being performed, or is going to be performed, in the processing system 100. Filtering intercepted activities 230 in the processing system 100 can eliminate analysis of non-suspicious activity which is not considered to be associated with malicious activity, such as a user-initiated activity to transfer data over the network.

Figure 17:
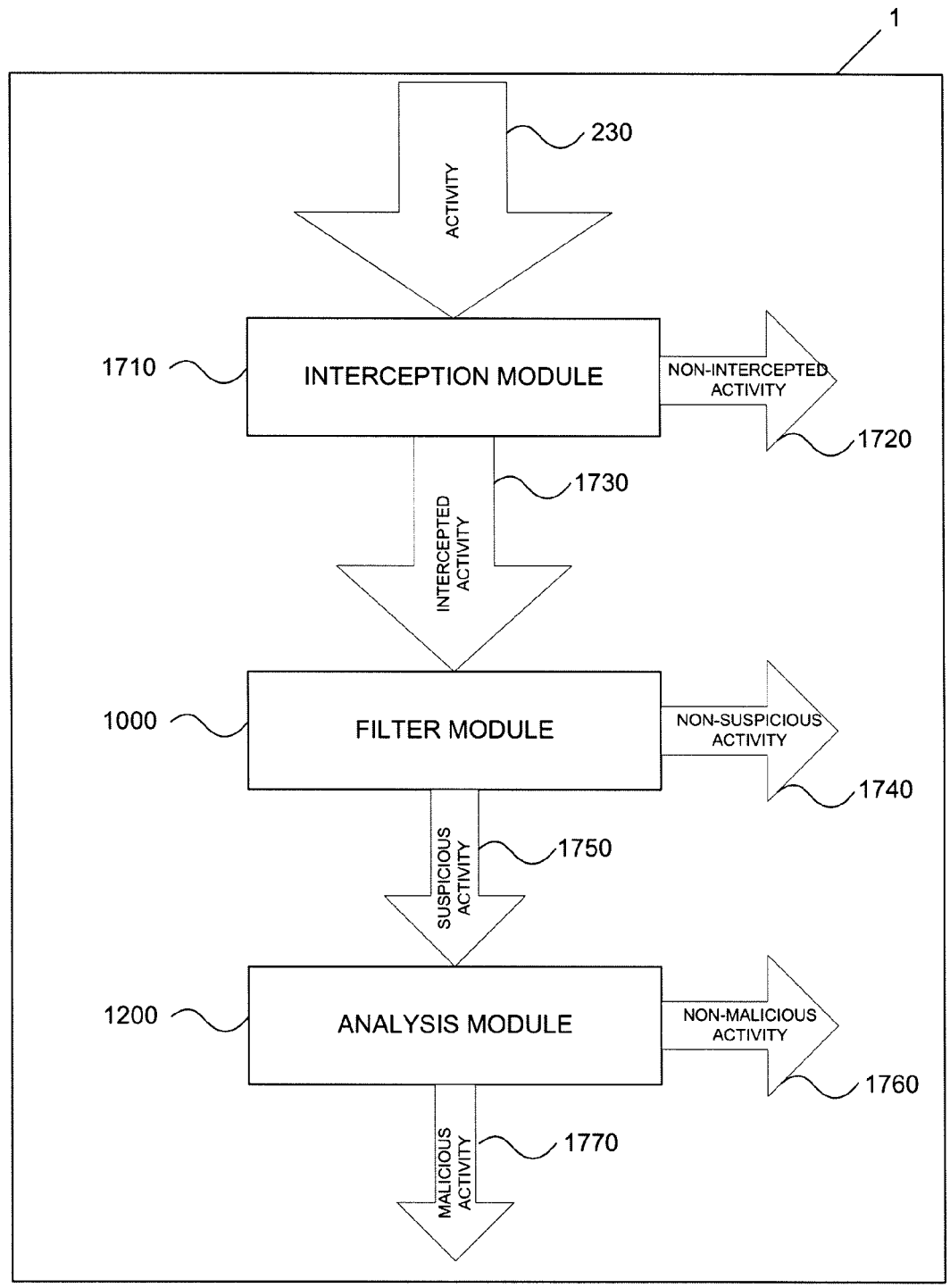
FIG. 17 illustrates a block diagram representing an example of the system to detect malicious activity.

FIG. 17 illustrates an example of a system 1 to detect malicious activity. In particular, at least some activities 230 that occur in the processing system 100 are intercepted by an interception module 1710 using the technique outlined in FIG. 3. The intercepted activities 1730 are then passed onto a filter module 1000. The non-intercepted activities 1720 are not passed to the filter module 1000. The filter module 1000 filters the intercepted activities 1730 according to at least one of the target entity 220 and/or the requesting entity 210 of the intercepted activity 1730. Intercepted activities 1730 which pass through the filter module 1000 are identified as suspicious activities 1750 and are analysed by the analysis module 1200 to determine if there is malicious activity 1770 being performed, or going to be performed, in the processing system 100.

The system 1 can be implemented in a single processing system 100. Alternatively, as will be discussed in more detail below, the system 1 can be implemented using one or more client processing systems 810 and one or more server processing systems 840. In this form, the system 1 determines whether there is malicious activity 1770 being performed, or going to be performed, in the one or more client processing systems 810.

Figure 5:
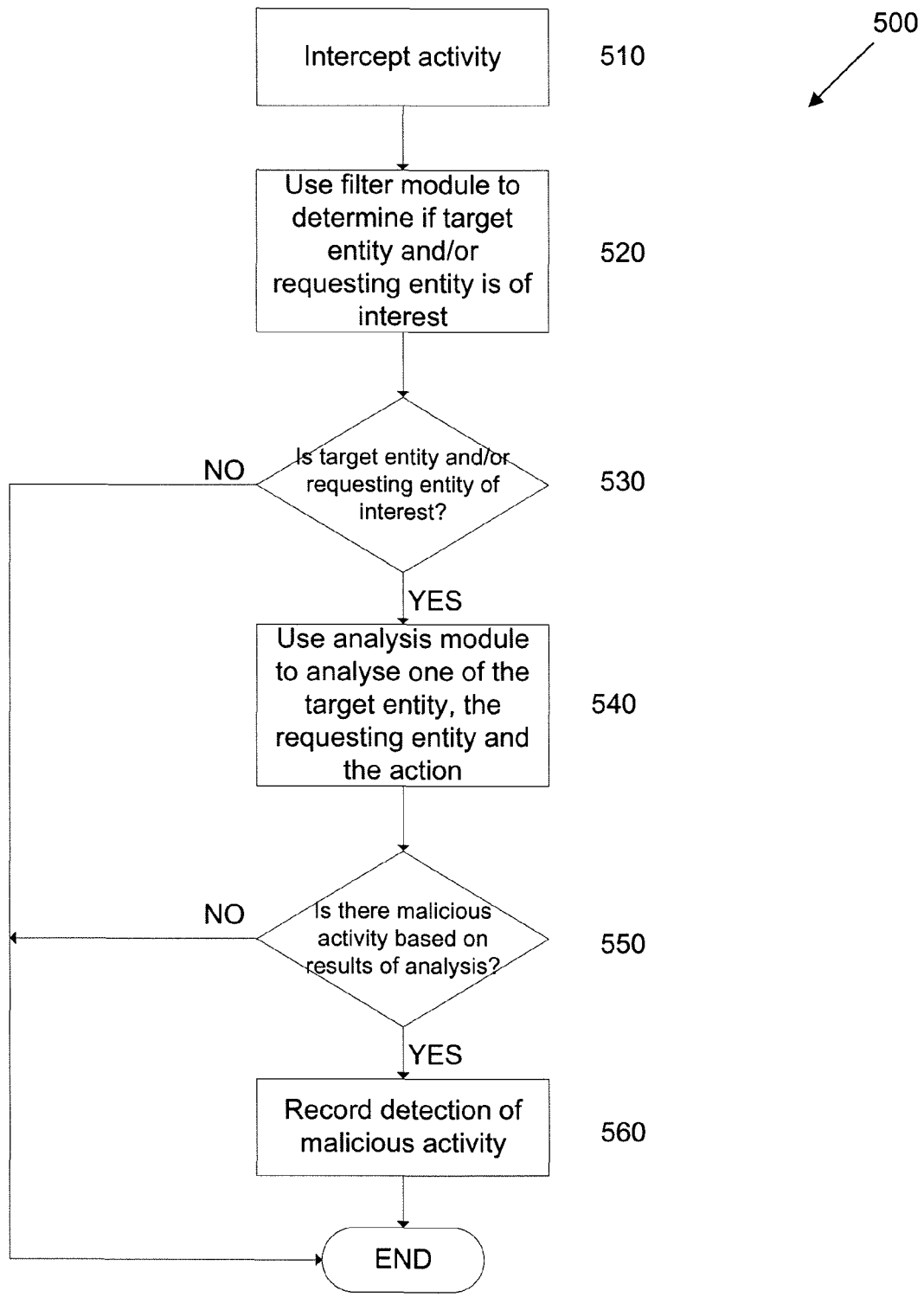
FIG. 5 illustrates a more detailed flow diagram of the method of FIG. 4.

FIG. 5 shows a more detailed flow diagram of the method 500 of FIG. 4. In particular, at step 510, the method 500 comprises intercepting the activity 230, as previously explained in relation to FIG. 3. At steps 520 and 530, the method 500 comprises using the filter module 1000 and one of the target entity 220 and/or the requesting entity 210 to determine if the activity 230 is suspicious 1750. In the event that the activity 230 is identified as being suspicious 1750, the method 500 proceeds to step 540.

At step 540, the method 500 comprises using an analysis module 1200 to analyse at least one of the target entity 220, the requesting entity 210 and the activity 230. At step 550, the method 500 comprises determining, based on the results of the analysis performed at step 540, whether there is malicious activity 1770 being performed, or going to be performed, in the processing system 100. In response to a positive determination, the method 500 optionally proceeds to step 560 where the detection of the malicious activity 1770 is recorded.

Optionally, in response to detecting the malicious activity 1770, the method 500 can comprise at least one of informing a user of the processing system 100 of the detection of the malicious activity 1770; restricting the malicious activity 1770 being performed (ie. failing to call the API procedure which executes the action 230 in relation to the target entity 220); prompting the user of the processing system 100 regarding the detected malicious activity 1770 and optionally receiving input from the user regarding steps to deal with the malicious activity 1770 (ie. deny the action, or allow the action). In the event that the processing system 100 in this example is a client processing system 810, the method can optionally comprise reporting the detection of malicious activity 1770 to the server processing system 840.

Figure 10:
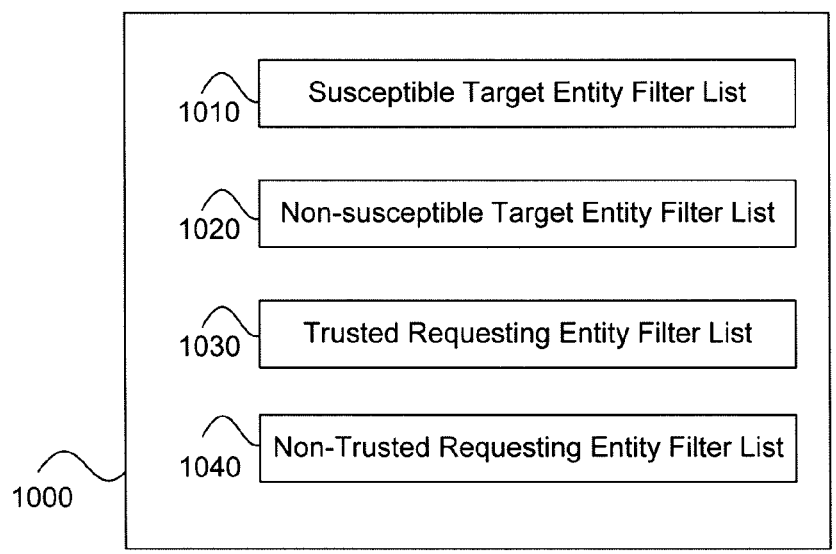
FIG. 10 illustrates a block diagram representing an example of a filter module.

Referring now to FIG. 10, there is shown a block diagram illustrating the filter module 1000. In particular, the filter module 1000 comprises a number of lists of filter rules for filtering activity 1730 intercepted in the processing system 100. The filter module 1000 can comprise at least one of a susceptible target entity filter list 1010, a non-susceptible target entity filter list 1020, a trusted requesting entity filter list 1030, and a non-trusted requesting entity filter list 1040.

The susceptible target filter list 1010 comprises one or more target entity filtering rules which determine if the target entity 220 relating to the intercepted activity 1730 is of interest, thereby identifying that the activity is considered suspicious 1750. For example, a common back door entity in a processing system 100 may generally be known to be susceptible to malware attacks. One of the target entity filtering rules may require a comparison of the name of the target entity 220 to the name of the common back door entity, and if the susceptible target entity rule is satisfied, the target entity 220 is considered of interest, therefore identifying the activity 230 being performed, or going to be performed, in relation to the target entity 220 as being suspicious 1750. Another susceptible target entity may be one or more registry keys of the system registry of the processing system 100. Another type of target entity filtering rule may determine whether the target entity 220 matches one of the susceptible registry keys, and if satisfied, the target entity 220 is considered of interest, thereby identifying the activity 230 as being suspicious 1750.

The non-susceptible target entity filter list 1020 comprises one or more target entity filtering rules which can be used to filter out target entities 220 which are not susceptible to malicious activity 1770 and thus are not considered of interest, thereby identifying the activity as being non-suspicious 1740. By using the non-susceptible target entity filter list 1020, an activity 230 that occurs in relation to a non-susceptible target entity 220 can be dismissed as being associated with malicious activity 1770, and thus an analysis does not need to be performed in relation to the activity 230.

The trusted requesting entity filter list 1030 is similar to the non-susceptible target entity list 1020 except this list 1030 comprises one or more filtering rules to filter out trusted requesting entities which are not considered of interest (ie. there is a high probability that the requesting entity 210 is not associated with malicious activity 1770), thereby identifying that the activity 230 as being non-suspicious 1740. For example, the requesting entity 210 of an operating system web-site attempting to transfer an operating system update to an update application stored in a processing system 100 may be such an instance of a trusted requesting entity 210. The trusted requesting entity filter list 1030 can comprise a requesting entity filter rule to filter out such activity associated with this type of requesting entity 210 such that an analysis does not need to be performed in relation to the activity 230. By determining a trusted requesting entity 210, the activity 230 is identified as being non-suspicious 1740.

The non-trusted requesting entity filter list 1040 is similar to the susceptible target entity filter list 1010 except this list 1040 comprises filter rules to determine requesting entities 210 which are of interest (ie. there is a high probability that the requesting entity 210 is associated with malicious activity 1770). For example, a requesting entity 210 attempting to open a specific port in the processing system 100 may be an example of a non-trusted requesting entity 210. The non-trusted requesting entity filter list 1040 can comprise a requesting entity filter rule which determines whether the requesting entity 210 is located outside a particular network domain, and if the filter rule is satisfied, the requesting entity 210 is identified as being of interest, which thereby identifies the activity 230 as being suspicious 1750.

Each filter rule in each list can have an associated filter rule identity. When a filter rule is satisfied, an identity of the satisfied filter rule can be recorded. Over time, particular filter rules may be satisfied on a higher frequency than other filter rules. The frequency of satisfaction for each rule can then be used to determine a filtering rating indicative of the frequency of satisfaction for the respective filter rule. As will be described in more detail below, the filtering rating can be used to determine an order which filter rules are used when filtering intercepted activities such that, on average, the number of filter rules used, prior to a filter rule being satisfied, is reduced. This process of determining an order which the filter rules can be performed by a single processing system 100 or alternatively, in a networked system (comprising a plurality of client processing systems 810 and at least one server processing system 840), wherein this ordering process can be performed by the at least one server processing system 840, as will be explained in more detail below.

In some instances, an activity 230 may have been identified as being non-suspicious using one of the lists of the filter module 1000, whereas a different list of the filter module 1000 may have identified the same activity 230 as being suspicious. In this instance, the worst case scenario can be considered, which can be to assume that the activity 230 is suspicious. One approach to is to use the susceptible target filter list 1010 and the non-trusted requesting entity filter list 1040 first prior to the non-susceptible target entity filter list 1020 and the trusted requesting entity filter list 1030 such that the worst case scenario is given priority.

In other instances, an activity 230 may not be identified as being suspicious nor non-suspicious. In this instance, a default identification can be assigned to the activity 230. Therefore, the default may be to identify the activity as being suspicious such that an analysis can be performed on the entity. However, a more lenient approach may be to set the default identification as being non-suspicious. In one form, the default identification can be defined by the user of a processing system.

Figure 6A:
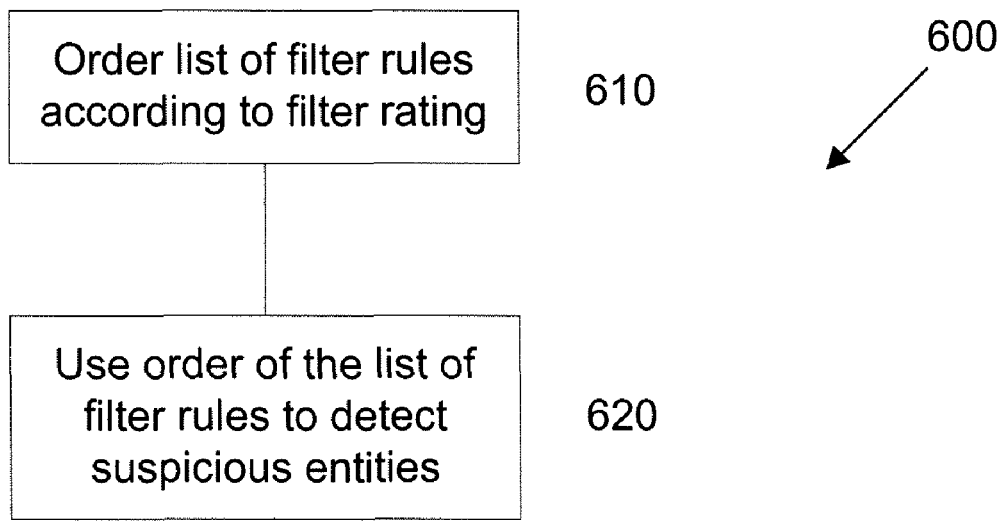
FIG. 6A illustrates a flow diagram illustrating an example method of determining an order a list of filter rules to detect malicious activity.

Referring to FIG. 6A, there is shown a flow diagram representing an example method 600 to facilitate the detection of malicious activity is a processing system 100.

In particular, at step 610, the method 600 comprises, in the processing system 100, determining an order of a list of filter rules according to a filter rating associated with each filter rule in the list. At step 620, the method 600 comprises using the order of the filter rules to determine suspicious entities in, or interacting with, the processing system 100.

Figure 6B:
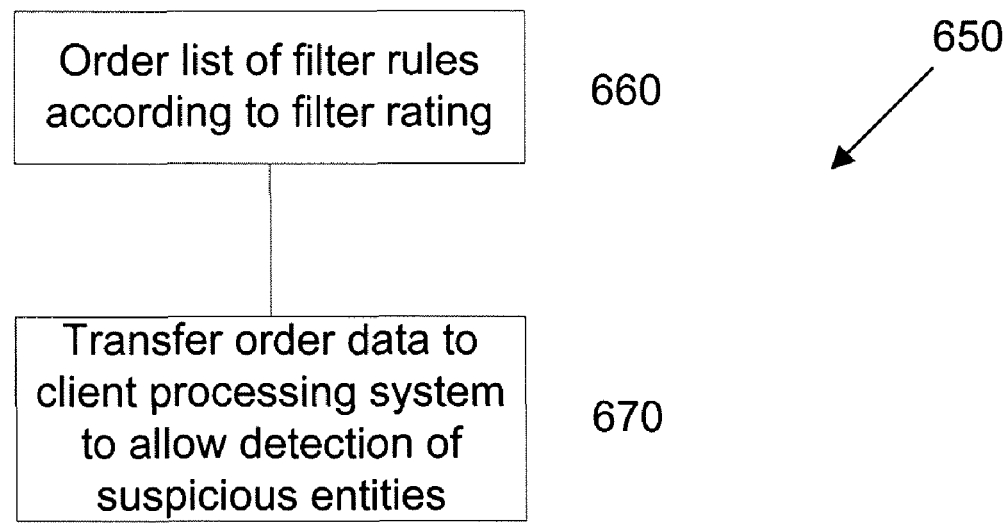
FIG. 6B illustrates a flow diagram illustrating an example method of determining an order a list of filter rules in a server processing system to detect malicious activity.

Referring now to FIG. 6B there is shown another flow diagram representing an example method 650 performed by a server processing system 840 to facilitate the detection of malicious activity 1770 in a client processing system 810.

In particular, at step 660, the method 650 comprises, in a server processing system 840, determining an order of a list of filter rules according to a filter rating associated with each filter rule in the list. At step 670, the method 650 comprises, transferring the order of the list of filter rules from the server processing system 840 to the client processing system 810 to allow the client processing system 810 to use the order of the filter rules to determine suspicious entities in, or interacting with, the client processing system 810.

As will be appreciated below, using a networked system (a plurality of processing systems 810 and at least one server processing system 840—FIG. 6B) advantageously allows the generation of the filter ratings and order of the filter rules using a larger number of samples from the plurality of client processing systems 810 in the networked system. However, in single processing system 100 forms (FIG. 6A), the filter ratings and the order of the filter rules is advantageously customised for that particular processing system 100.

Figure 7:
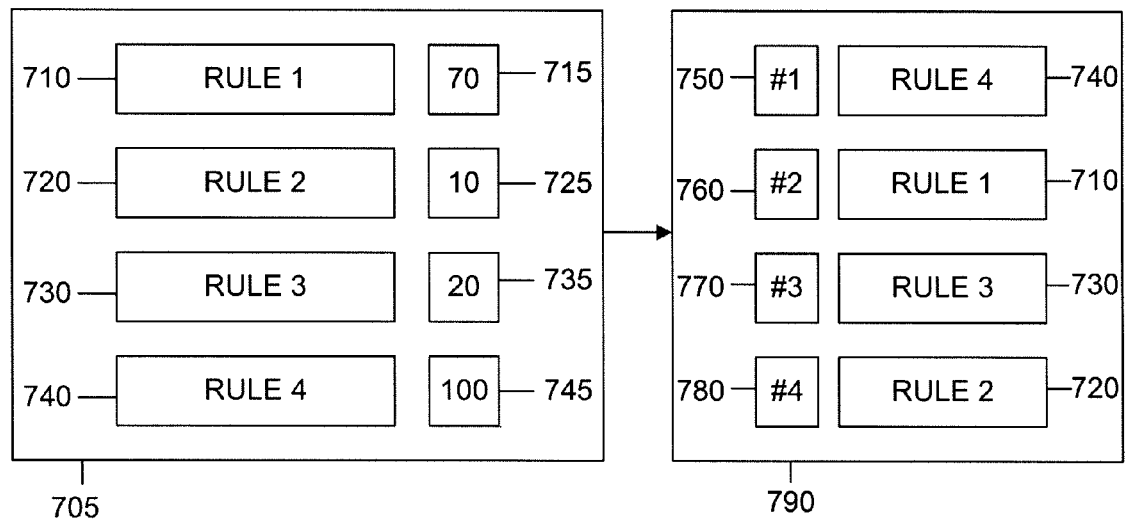
FIG. 7 illustrates a block diagram illustrating an example of determining an order of a list of filter rules.

Referring now to FIG. 7 there is shown a block diagram illustrating the process of determining an order of a list of filter rules.

In particular, the block diagram comprises a list 705 of filter rules 710, 720, 730, 740. Each filter rule has a respective associated filter rating 715, 725, 735, 745. Each filter rating is at least indicative of the frequency that the respective filter rule has been previously satisfied that a target entity 220 and/or a requesting entity 210 is of interest. In this example, "Rule 1" 710 has an associated filter rating 715 of "70" and "Rule 2" 720 has an associated filter rating 725 of "10". This indicates that "Rule 1" has been satisfied more frequently than "Rule 2" in relation to a target entity 220 and/or a requesting entity 210 being identified as being of interest (ie. the activity 230 has been identified as being suspicious 1750).

As shown in ordered list 790, the filter rules are ordered in descending order according to the respective filter ratings for each filter rule in the list 705. Thus, "Rule 4" 740 has the highest filter rating and therefore this filter rule is positioned at the start 750 of the list. "Rule 1" has the next highest filter rating and is therefore positioned second 760, followed by "Rule 3" and then "Rule 2".

By determining an order of the filter rules according to the filter rating, rules which have been satisfied more frequently are used first when determining if the requesting entity and/or target entity is considered of interest prior to less frequently satisfied filter rules in the list 705. This order of use can, on average, reduce the number of filter rules that need to be used, prior to one of the filter rules being satisfied. Order data 790 indicative of the order of the list 790 can be transferred to one or more client processing systems 810 such that the order indicated by the order data 790 can be used when applying the filter rules to determine suspicious activities 1750.

It will be appreciated that the order data 790 may be transferred to the plurality of client processing systems 810 in response to feedback filter data 820 being received from one of the client processing systems 810. Additionally or alternatively, one of the client processing systems 810 may transfer a request for an updated order of the filter rules, and in response, the server processing system 840 transfers the order data 790 to the requesting client processing system 810. Updated filter rules may also be transferred to one or more client processing systems 810. In another additional or alternative form, the server processing system 840 may be scheduled to periodically transfer the order data to the plurality of the client processing systems 810. This for example, could be accomplished through e-mail as well as other known data transferral techniques such as FTP and the like.

Figure 8:
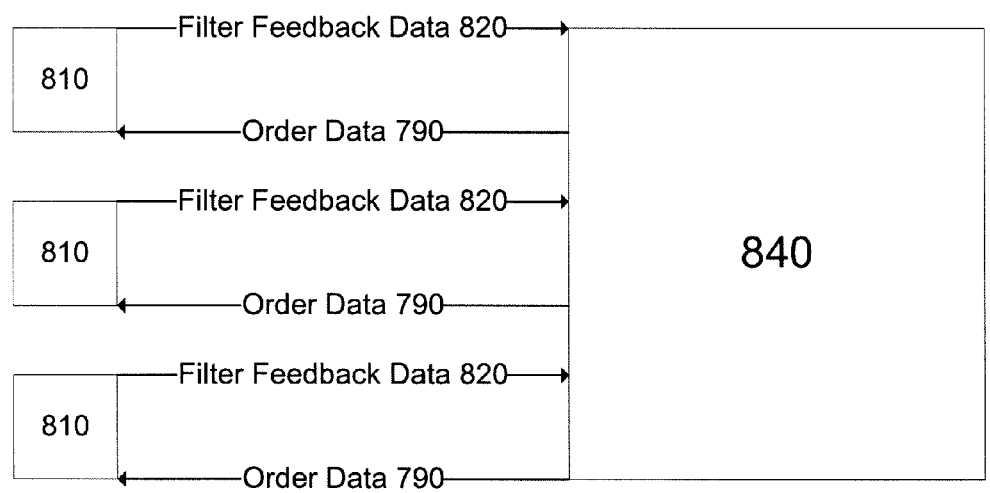
FIG. 8 illustrates a block diagram illustrating an example of a system comprising a client processing system and a server transferring and receiving order data and feedback detection data.

FIG. 8 shows a block diagram illustrating an example of the system 1 comprising a plurality of client processing systems 810 and a server processing system 840.

In particular, each client processing system 810 transfers, to the server processing system 840, filter feedback data 820 indicative of frequencies that one or more filter rules has been satisfied. The server processing system 840 updates a satisfaction frequency stored for each relevant filter rule using the filter feedback data 820. The server processing system 840 then updates relevant filter ratings for each rule based on the filter feedback data 820, and then orders the filter rules in each list according to the updated filter ratings. Order data 790 indicative of the order of the filter rules in each list is then transferred to the client processing systems 810 such that each client processing system 810 can use filter rules in the order represented by the order data when determining if a target entity 220 and/or requesting entity 210 is of interest, thereby, on average, reducing the number of rules which are required to be used.

Figure 9:
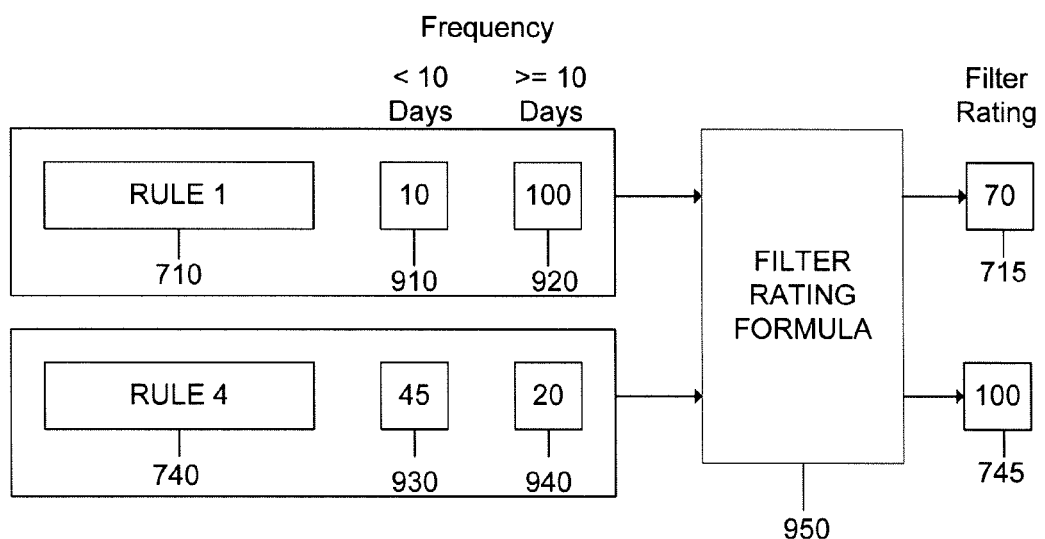
FIG. 9 illustrates a block diagram illustrating the determination of a filter rating.

Referring to FIG. 9, there is shown a block diagram illustrating the determination of the filter rating.

As previously indicated, each filter rule stored in the server processing system 840 comprises an associated frequency indicative of the number of times the filter rule has been satisfied in the plurality of client processing systems 810. The frequency can be split into a number of portions. In this example, the frequencies are split into two portions: a first portion 910, 930 being the frequency that the filter rule had been satisfied within the past ten days; and a second portion 920, 940 being the frequency that the filter rule had been satisfied outside the past ten days. As seen from FIG. 9, "Rule 1" 710 has been satisfied ten times within the past ten days and has also been satisfied one-hundred times outside the past ten days. "Rule 4" 740 has been satisfied forty-five times within the past ten days and has also been satisfied twenty times outside the past ten days.

This distribution of frequencies between the frequency portions 910, 920, 930, 940 can indicate a trend of malicious activity 1770 in relation to the plurality of client processing systems 810. For example, in regard to "Rule 1" 710, which may be a susceptible target entity filter rule, there may have been a software patch that has been recently distributed amongst client processing systems 810 that has resulted in "Rule 1" being satisfied less often compared to past frequencies that occurred outside the ten day period. In regard to "Rule 4" 740, which may also be a susceptible target entity filter rule, there may have been an outbreak of malware which is targeting particular susceptible entities and accordingly "Rule 4" has recently been satisfied more often compared to past frequencies that occurred outside this ten day period, as indicated by the rise of the frequency within the past ten days.

In order to take into account trends in malicious activity, such as outbreaks of specific malicious activity and distributions of software patches, a filter rating formula 950 is used to weight the distribution of frequencies for each filter rule. In this example the filter rating formula is shown below:

FilterRating=2×recentFreq+0.5×olderFreq

Where:
recentFreq=frequency of instances when the rule was satisfied within last 10 days
olderFreq=frequency of instances when the rule was satisfied outside last 10 days It will be appreciated that differing weights can be used. Furthermore, it will be appreciated that a larger breakdown of frequency distribution can be used.

As can be seen from the filter rating formula 950, the frequency of instances when the filter rule was satisfied within the past ten days is weighted more heavily in order to take into account trends of malicious activity. Thus, the filter rating for "Rule 1" and "Rule 4" are calculated to be:

FilterRatingRule1=2×10+0.5×100=70

FilterRatingRule4=2×45+0.5×20=100

As can be seen from the respective filter ratings for "Rule 1" 710 and "Rule 4" 740, even though "Rule 1" 710 has been satisfied more often in the past, it appears that "Rule 4" 740 has recently been satisfied more often due to an outbreak of malware targeting susceptible entities which "Rule 4" 740 determines to be of interest. Thus, "Rule 4" 740 receives a higher filter rating compared to "Rule 1" 710 due to the recent trend in malicious activity. When this list of filter rules is ordered, "Rule 4" 740 is ranked higher in the list compared to "Rule 1" 710 and therefore "Rule 4" 740 is used prior to "Rule 1" 710 when determining suspicious activity 1750. As "Rule 4" 740 has recently been satisfied more often due to the trend in malicious activity, it is more likely that an activity 230 would be identified as being suspicious using "Rule 4" 740 rather than "Rule 1" 710. Therefore, "Rule 4" 740 can be used first when filtering an intercepted activity 1730 so as to reduce the number of instances that "Rule 1" 710 is used by the filter module 1000. On average, this ordering of the filter rules can reduce the number of applications of rules by the filter module 1000, thereby resulting in an efficient filtering process.

Figure 11:
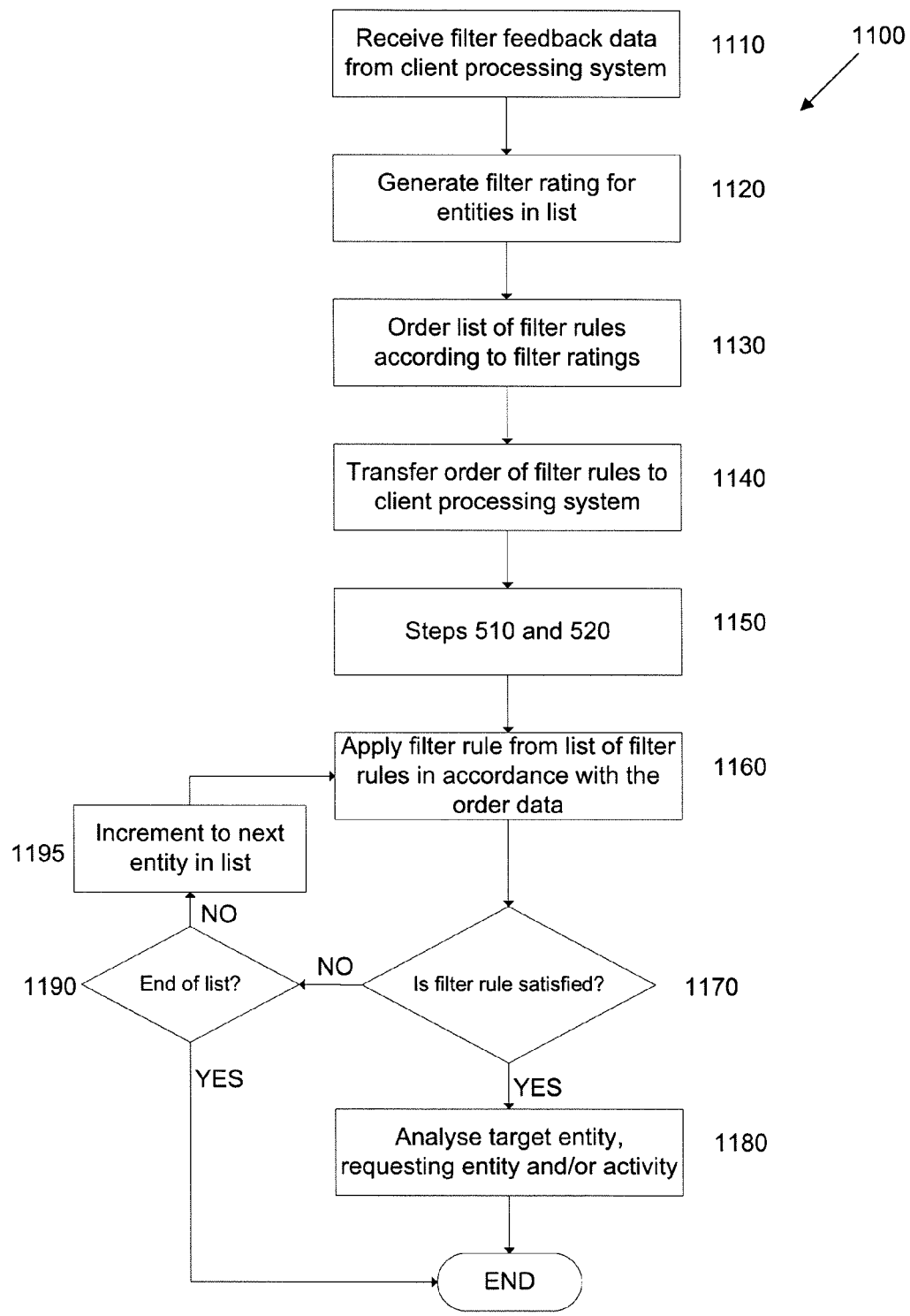
FIG. 11 illustrates a flow diagram representing a more detailed example of the method illustrated in FIG. 6B.

Referring now to FIG. 11, there is shown another more detailed example of the method of FIG. 6B. For simplicity purposes, the filter module 1000 in this example comprises only a single filter list, that being a susceptible target entity filter list 1010. However, it will be appreciated that the filter module 1000 can use more than one filter list, as previously indicated.

At step 1110, the method 1100 comprises the server processing system 840 receiving feedback filter data 820 indicative of frequencies that the susceptible target entity filter rules have been satisfied. At step 1120, the method 1100 comprises the server processing system 840 generating filter ratings for the relevant susceptible target entity filter rules in the list. At step 1130, the method 1100 comprises ordering the list of susceptible target entity filter rules according to the associated filter ratings. At step 1140, the method 1100 comprises the server processing system 840 transferring order data 790 indicative of the order of the list of susceptible target entity filter rules to the client processing system 810.

At step 1150, the method 1100 comprises performing steps 510 and 520 of method 500. At step 1160, the method 1100 comprises retrieving a susceptible target entity filter rule, according to the order data 790, from the susceptible target entity filter list and then applying the susceptible entity filter rule in relation to the target entity 220 of the intercepted activity 1730. The application of the susceptible target entity filter rule may comprise comparing the target entity 210 name to a known susceptible target entity, however, more complex comparisons may be performed by each susceptible target entity filter rule such as comparing cryptographic hash values of the susceptible target entity to that of the target entity 220.

At step 1170, in the event that the susceptible target entity filter rule is satisfied such that the target entity 220 for the intercepted activity 1730 is considered of interest, which thereby identifies the activity 230 as being suspicious 1750, the method 1100 proceeds to step 1180 where the analysis module 1200 is used to analyse at least one of the target entity 220, the requesting entity 210 and the activity 230.

In the event that the susceptible target entity filter rule is not satisfied, the method proceeds to step 1190 where the method 1100 determines whether the end of the list of susceptible target entity filter rules has been reached. If the end of the list has not been reached, the method 1100 proceeds to step 1195 which comprises incrementing to the next susceptible entity target filter rule in the list. For example, in regard to the example in FIG. 7, "Rule 4" 740 would have been used first, and then in the event that "Rule 4" 740 was not satisfied, "Rule 1" 710 would then be applied next as this filter rule has the next highest filter rating according to the order data 790.

Steps 1160 and 1170 are iteratively performed until either the end of the list is reached, or a filter rule is satisfied. Due to the filter rules in the list being ordered according to the filter rating, on average, the number of rules which are applied, prior to a filter rule being satisfied, is reduced.

Figure 12:
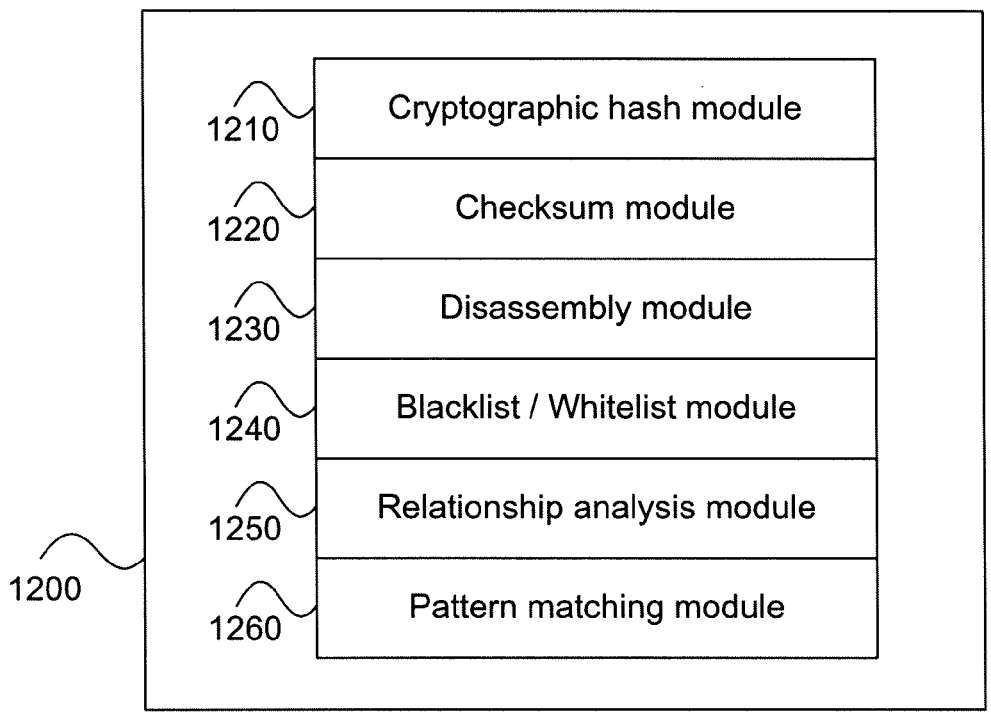
FIG. 12 illustrates a block diagram representing an analysis module.

As shown in FIG. 12, the analysis module 1200 can comprise a number of further sub-modules to determine if the processing system 100 is performing, or is going to perform, malicious activity 1770.

In particular, the analysis module 1200 can comprise the sub-modules of a cryptographic hash module 1210, a checksum module 1220, a disassembly module 1230, a black-list/white-list module 1240, a relationship analysis module 1250, and a pattern matching module 1260. The analysis module 1200 can be used to determine if the activity 230 requested to be performed, or going to be performed, by the requesting entity 210 in relation to the target entity 220 is associated with malicious activity 1770.

The analysis module 1200 can be configured to use one or more of these sub-modules exclusively or in combination to detect malicious activity 1770 in the processing system 100. The analysis module 1200 can be used to analyse at least one of the target entity 220, the requesting entity 210, and the activity 230 to determine if there is malicious activity 1770 to be performed, or being performed, in the processing system 100.

The cryptographic hash module 1210 of the analysis module 1200 is configured to generate a cryptographic hash value of an entity. As the cryptographic hash value can be used an identity, the cryptographic hash value can be used in comparisons with the blacklist/whitelist module 1240 to determine whether the entity is malicious.

The checksum module 1220 of the analysis module 1200 is configured to determine a checksum of an entity of the processing system 100. The checksum can be compared to a database (blacklist/whitelist module 1240) to determine whether the entity is malicious.

The pattern matching module 1260 of the analysis module 1200 is configured to search an entity for particular patterns of strings or instructions which are indicative of malicious activity. The pattern matching module 1260 may operate in combination with the disassembly module 1230 of the analysis module 1200.

The disassembly module 1230 is configured to disassemble binary code of an entity such that the disassembly module 1230 determines processing system instructions for the entity. The processing system instructions of the entity can then be used by the pattern matching module 1260 to determine whether entity is malicious. Although strings of instructions can be compared by the pattern matching module 1260, the pattern matching module 1260 may be configured to perform functional comparisons of groups of instructions to determine whether the functionality of the entity is indicative of malware.

The blacklist/whitelist module 1240 of the analysis module 1200 comprises a list of malicious and/or non-malicious entities. The blacklist/whitelist module 1240 may be provided in the form of a table or database which comprises data indicative of malicious and non-malicious entities. The table may comprise checksums and cryptographic hash values for malicious and non-malicious entities. The data stored in the blacklist/whitelist module 1240 can be used to determine whether an entity in the processing system 100 is malicious or non-malicious.

Figure 13:
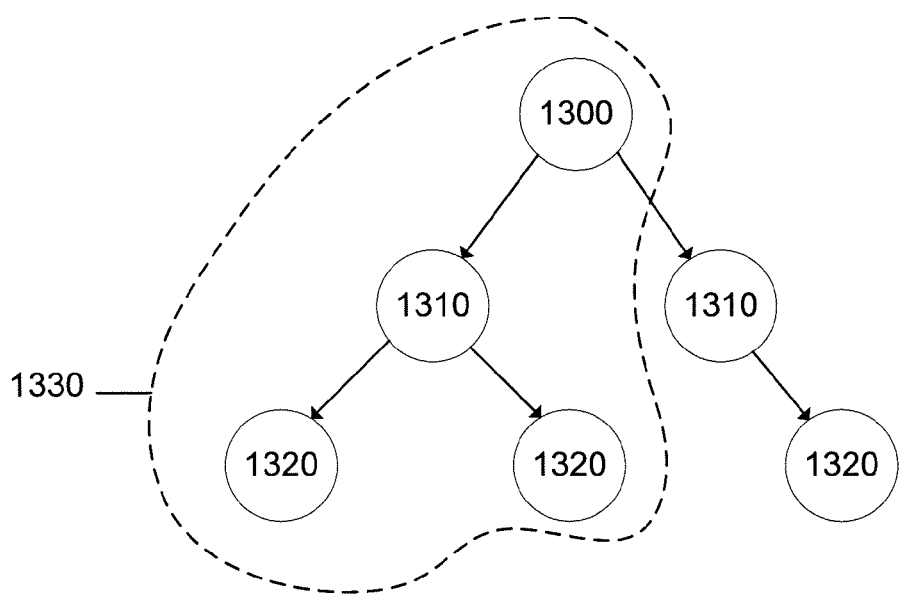
FIG. 13 illustrates a functional block diagram of the operation of a relationship analysis module.

The relationship analysis module 1250 can be used to detect related entities based on a starting entity 1300. As shown by example in FIG. 13, once a target entity 220 or requesting entity 210 has been determined to be of interest using the filter module, the target entity or requesting entity can be treated as the starting entity 1300, and then using the relationship analysis module 1250, a web of entities 1330 related to the starting entity 1300 can be determined. A detailed explanation of detecting related one or more related entities is described in the Applicant's co-pending U.S. patent application Ser. No. 11/707,425 and co-pending Australian Patent application AU2007200605 entitled "Determination of related entities", the content of which is herein incorporated by cross-reference.

In some instances, malware comprises a bundle of malicious entities. By only considering a single entity by itself, it may not be accurately possible to determine if a target entity 220 or requesting entity 210 of a suspicious activity 1750 is associated with malicious activity 1770. However, by determining related entities to the target entity 220 or requesting entity 210, a more accurate assessment can be made in relation to whether or not the suspicious activity is associated with malicious activity. Furthermore, removing a single malicious entity may not necessarily disable the malware from performing some malicious activity. Some particular forms of malware can perform repairs in relation to a single malicious entity being removed or disabled. Therefore, detecting a group of related entities can be beneficial for disabling malware.

Figure 14:
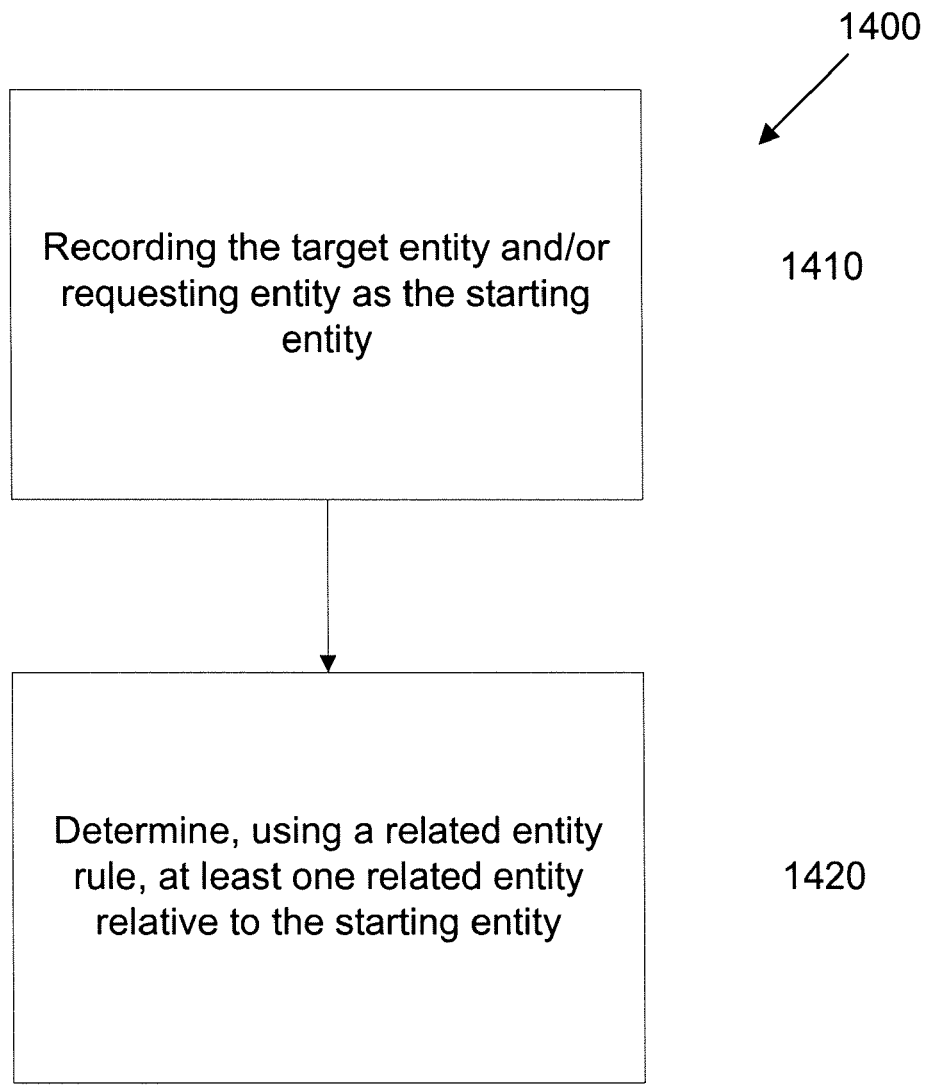
FIG. 14 illustrates a flow diagram representing an example of a method performed by the relationship analysis module.

Referring now to FIG. 14, there is illustrated a flow diagram illustrating an example method 1400 of determining a group of related entities in a processing system 810. The method 1400 represents the operation of the relationship analysis module 1250.

In particular, at step 1410 the method 1400 comprises recording the target entity 220 and/or requesting entity 220, which was determined to be of interest, as the starting entity 1300. At step 1420, the method 1400 comprises determining, using a related entity rule, at least one related entity 1310 relative to the starting entity 1300.

Figure 15A:
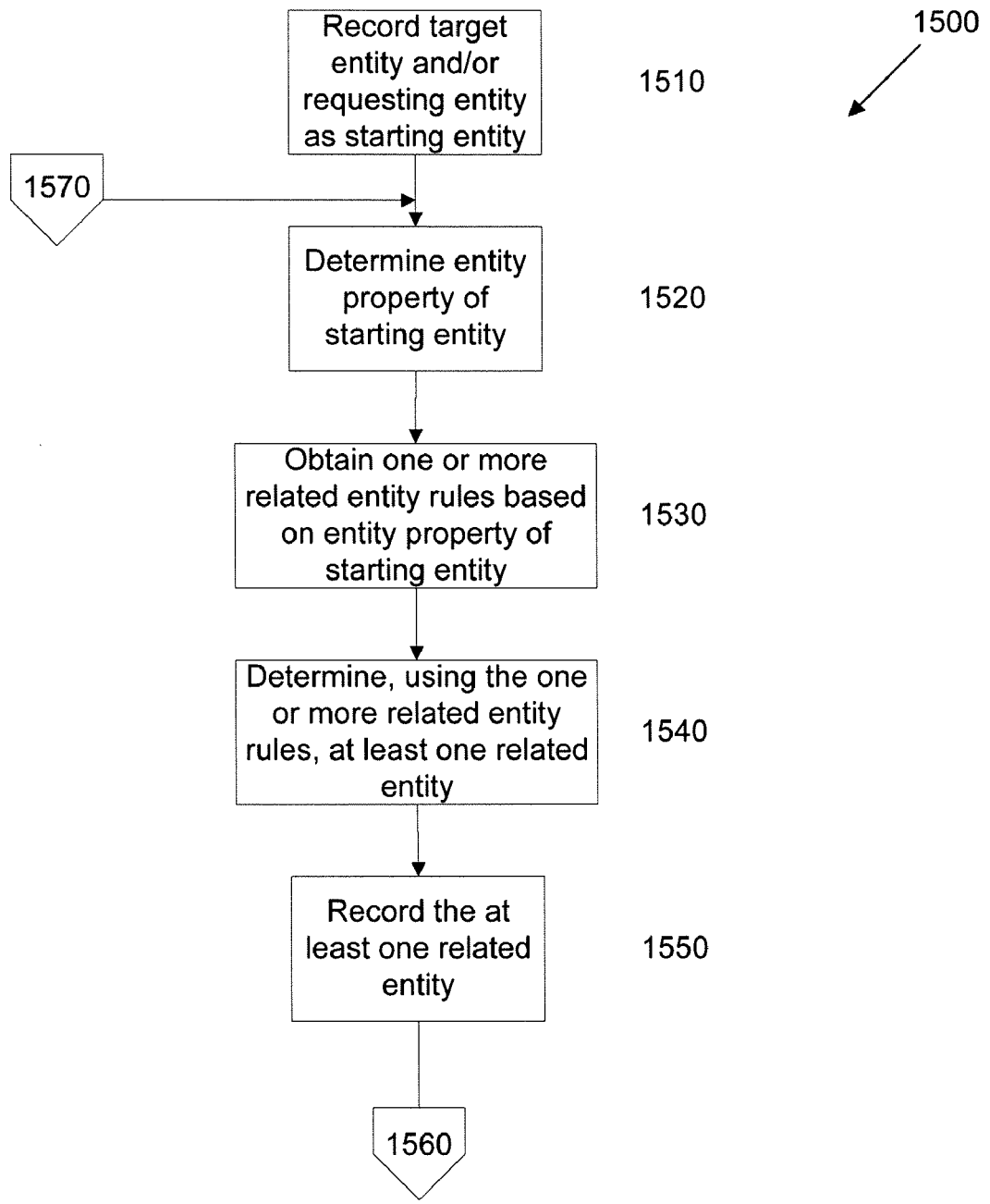
FIGS. 15A and 15B illustrate a more detailed flow diagram of the example method of FIG. 14.
Figure 15B:
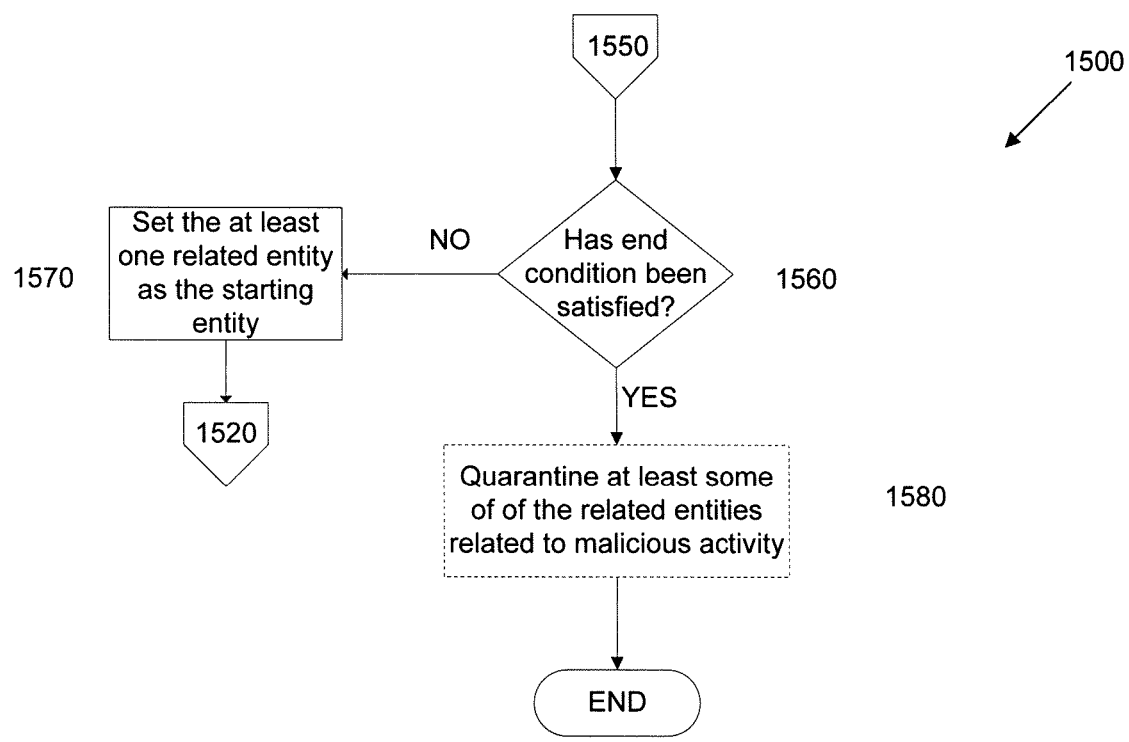

A more detailed example of a method illustrated in FIG. 14 will now be described with reference to FIGS. 15A and 15B, which are directed towards determining a group of related entities for a requesting entity 210 identified as being of interest. It will be appreciated by those skilled in the art that the method 1500 can be applied for determining a group of related entities for a target entity 220.

In particular, at step 1510, the method 1500 comprises recording the requesting entity 210 as the starting entity 1300. This can comprise the client processing system 810 recording the starting entity 1300 in the client processing system memory, such as a data store. The starting entity 1300 may be stored in the form of a table or list.

At step 1520, the method 1500 comprises determining an entity property associated with the starting entity 1300. The entity property may be an entity type of the entity, such as whether the starting entity is an executable entity, a run key entity or a dynamic linked library entity. The entity property may also be a time that the entity was created or modified. The entity property may comprise the directory which the entity is contained within. The entity property may also be a vendor name associated with the entity. The entity property may also be a particular network address from which the entity was downloaded.

It will be appreciated that more than one entity property may be determined for the starting entity 1300. However, for the purposes of simplicity for this example, it will be assumed that one entity property has been determined for the starting entity.

At step 1530, the method 1500 comprises obtaining, based on the entity property of the starting entity 1300, one or more related entity rules. In this particular example, the one or more related entity rules take the form of one or more rules for determining one or more suspicious entities related to the starting entity 1300. Step 1530 may comprise selecting, based on the entity property, the one or more related entity rules from a larger set of related entity rules. Each related entity rule is associated with a particular entity property, and as such, a selection of a related entity rules can be performed based on the entity property of the starting entity. An example list of entity properties and corresponding related entity rules is shown below in List 1.

(i) if the starting entity comprises a vendor name, the at least one suspicious related entity is one or more entities comprising the same vendor name;

(ii) if the starting entity comprises a product name, the at least one suspicious related entity is one or more entities comprising the same product name;

(iii) if the starting entity comprises a version name, the at least one suspicious related entity is one or more entities comprising the same version name;

(iv) if the starting entity was created at a particular time in the one or more processing systems, the at least one suspicious related entity is one or more entities which were created at a similar time to that of the starting entity;

(v) if the starting entity accesses a particular network address or network address range or network address names, the at least one suspicious related entity is one or more entities which also access the same particular network address or network address range or network address names.

(vi) if the starting entity accesses a particular network address or network address range, the at least one suspicious related entity is the particular network address or network address range or network address names.

(vii) if the starting entity causes another process to execute, the at least one suspicious related entity is one or more entities which was executed by it.

(viii) if the starting entity was executed by a process, the at least one suspicious related entity is one or more entities which executed the starting entity.

(ix) If the starting entity creates or modifies an entity, the at least one suspicious related entity is one or more entities which it creates or modifies.
(x) If the starting entity is found in a directory not in a list of whitelist directories, the at least one suspicious related entity is one or more entities which also exist in the same directory.
(xi) If the starting entity is downloaded from the internet/tcpip, the at least one suspicious related entity is one or more entities which were downloaded at the same time or by the same process or from the same particular network address or network address range or network address names.

List 1: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 1

Further example of Entity Properties and corresponding related entity rules

| Entity Property | Related Entity Rule |
|---|---|
| trigger entity | The one or more suspicious related entities are triggerable entities which are triggerable by the run-key entity |
| executable entity | The one or more suspicious related entities are one or more files in an INF file associated with the starting entity |
| executable entity | The one or more suspicious related entities are one or more trigger entities which trigger the starting entity |
| executable entity | The one or more suspicious related entities are one or more favourites which trigger the starting entity |
| executable entity | The one or more suspicious related entities are one or more items of embedded executable content inside the starting entity |
| executable entity | The one or more suspicious related entities are one or more instances of windows created by the executable entity |
| executable entity | The one or more suspicious related entities are one or more desktop link files (short cuts) which trigger the executable entity |
| executable entity | The one or more suspicious related entities are one or more modules loaded by the starting entity |
| executable entity | The one or more suspicious related entities are one or more classids or guids assocaiated with the starting entity |
| executable entity | The one or more suspicious related entities are one or more network addresses or network address ranges or network address names associated with the starting entity |
| classid/guid entity | The one or more suspicious related entities are one or more BHO or TOOLBAR names associated with the classid/guid |
| classid/guid entity | The one or more suspicious related entities are one or more one or more class names associated with the classid/guid |
| classid/guid entity | The one or more suspicious related entities are one or more network addresses or network address ranges or network address names associated with the starting entity |
| classid/guid entity | The one or more suspicious related entities are one or more executable entities related to the classid/guid |
| module entity | The one or more suspicious related entities are one or more executable entities that are loaded by the module entity |
| network address/network address range/network address name | The one or more suspicious related entities are one or more files associated with the network address or network address range or network address name |
| network address/network address range/network address name | The one or more suspicious related entities are one or more links or short cuts associated with the network address or network address range or network address name |
| network address/network address range/network address name | The one or more suspicious related entities are one or more classids associated with the starting entity |
| network address/network address range/network address name | The one or more suspicious related entities are one or more favourites associated to the starting entity |
| network address/network address range/network address name | The one or more suspicious related entities are one or more executable entities related to the starting entity |
| network address/network address range/network address name | The one or more suspicious related entities are one or more start pages related to the starting entity |
| network address/network address range/network address name | The one or more suspicious related entities are one or more cookies related to the starting entity |
| BHO Tool Bar entity | The one or more suspicious related entities are one or more classids associated with the starting entity |
| BHO Tool Bar entity | The one or more suspicious related entities are one or more names associated with the starting entity |
| BHO Tool Bar entity | The one or more suspicious related entities are one or more executable entities executed by the starting entity |

TABLE 1-continued

Further example of Entity Properties and corresponding related entity rules

| Entity Property | Related Entity Rule |
| --- | --- |
| Favourites entity | The one or more suspicious related entities are one or more network addresses or network address ranges or network address names |
| Favourites entity | The one or more suspicious related entities are one or more executable entities executed by the starting entity |
| Links entity | The one or more suspicious related entities are one or more network addresses or network address ranges or network address names |
| Links entity | The one or more suspicious related entities are one ore more executable entities executed by the starting entity |
| Cookie entity | The one or more suspicious related entities are one or more network addresses or network address ranges or network address names associated with the starting entity |
| windows instance entity | The one or more suspicious related entities are one ore more executable entities that create the starting entity |
| Directory (not in a whitelist) entity | The one or more suspicious related entities are one or more entities that exist in that same directory. |
| INF entity | The one or more suspicious related entities are one or more entities referenced in the starting entity |
| Archive entity | The one or more suspicious related entities are one ore more entities within the archive entity |
| Archive entity | The one or more suspicious related entities are one or more entities in the same directory as the archive entity which fail to appear in a whitelist |
| vendor name of entity | The one or more suspicious related entities are one or more entities which share the same vendor name as the starting entity |
| product name entity | The one or more suspicious related entities are one or more entities which share the same product name as the starting entity |
| version name | The one or more suspicious related entities are one or more entities which share the same version name as the starting entity |
| Creation/Modification time of entity | The one or more suspicious related entities are one or more entities which a similar creation/modification time |

It will be appreciated that a starting entity 1300 having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 1 that the general entity properties and related entity rules can be extended to specific entity types, such as the entity types shown in Table 1, for example INF entities, Cookies entity, windows instance entity and the like shown above. The more specific rules in Table 1 allow for a more specific selection of rules based on the more specific entity property, which can therefore result in accurately determining the relevant suspicious related entity rules.

It will also be appreciated from Table 1 that more than one related entity rule can be obtained based on the one or more entity properties of the starting entity 1300. As shown above in Table 1, if the entity property indicates that the starting entity 1300 is an executable entity, then nine separate types of related entity rules can be applicable for determining the suspicious related entities relative to the starting entity 1300.

Additionally or alternatively, the client processing system 810 may transfer, to a server processing system 840, the entity property of the starting entity 810, and receive, from the server processing system 840, the one or more related entity rules. In this step, the server processing system 840 may select the one or more related entity rules using the entity property from a server set of related entity rules, and then transfer the one or more related entity rules to the client processing system 810.

At step 1540, the method comprises determining, using the one or more related entity rules, the at least one related entity. In this particular example the related entity rules determine one or more related suspicious entities in relation to the starting entity 1300. For simplicity purposes, the following example is presented using one related entity rule, however, it will be appreciated that more than one related entity rule can be used. In this example the starting entity 1300 may be "Spywarz.exe" which comprises a vendor name of "Spywarz Software Enterprises". The entity property of the vendor name is used to obtain a related entity rule such as:

"The one or more related entities have a vendor name equalling 'Spywarz Software Enterprises'".

This related entity rule is then used to determine any entities in the client processing system 810 which satisfy this rule. When a scan has been performed using the related entity rule, it was determined that "Spywarz.dll" comprises a vendor name of 'Spywarz Software Enterprises'. As the related entity rule has been satisfied, 'Spywarz.dll' is considered a related entity 1310 to the starting entity 1300 'Spywarz.exe'. As such, a group of suspicious related entities has been determined which comprises 'Spywarz.exe' and 'Spywarz.dll'.

Optionally, weighted values may be associated with the related entity rules.

Steps 1510 to 1540 represent a single iteration to determine a group of suspicious related entities. However, if a more detailed group of related entities 1310 is required, it is possible to perform multiple iterations of steps 1500 to 1540, as will now be discussed.

At step 1550, the at least one related entity 1310 is recorded. This may involve adding the at least one related entity 1310 to the list or a table which comprises the starting entity recorded 1300 at step 1510. Furthermore, the list or table may comprise data indicative of the relationship between the at least one related entity 1310 and other entities which have been previously recorded.

At step 1560, the method 1500 comprises determining if an end condition has been met. For example, the end condition may be satisfied when no other related entities 1310 are determined; when no other related entities 1310 are determined in a period of time; when the starting entity has an entity type which is indicative of the end condition; and/or when a selected number of repetitions have been performed. If the end condition has not been met, the method continues to step 1570.

At step 1570, the method 1500 comprises setting the at least one related entity 1310 as the starting entity 1300. This may be performed in memory by reassigning the value of the starting entity 1300. By setting the at least one related entity 1310 as the starting entity 1300, steps 1520 to 1550 can be repeated until an end condition is met. After step 1570, the method proceeds back to step 1520 to perform the next iteration, therefore determining the related entities for the newly set starting entity. As such, a web or network of related entities is determined until the end condition is met.

Once the end condition is satisfied, the determination of the group of related entities 1300, 1310, 1320 has been completed, and thus the other sub-modules 1210, 1220, 1230, 1240, 1260 of the analysis module 1200, and/or a server-side analysis module, can be used to determine whether the group of related entities 1300, 1310, 1320, or at least some of the related entities 1330, are associated with malicious activity 1770.

Optionally at step 1580, the method 1500 comprises quarantining at least some of the related entities 1330 which are determined to be associated with malicious activity 1770. Generally, quarantining may comprise removing these entities from the client processing system 810. Additionally or alternatively, this may comprise modifying the entities associated with malicious activity 1770.

Figure 16:
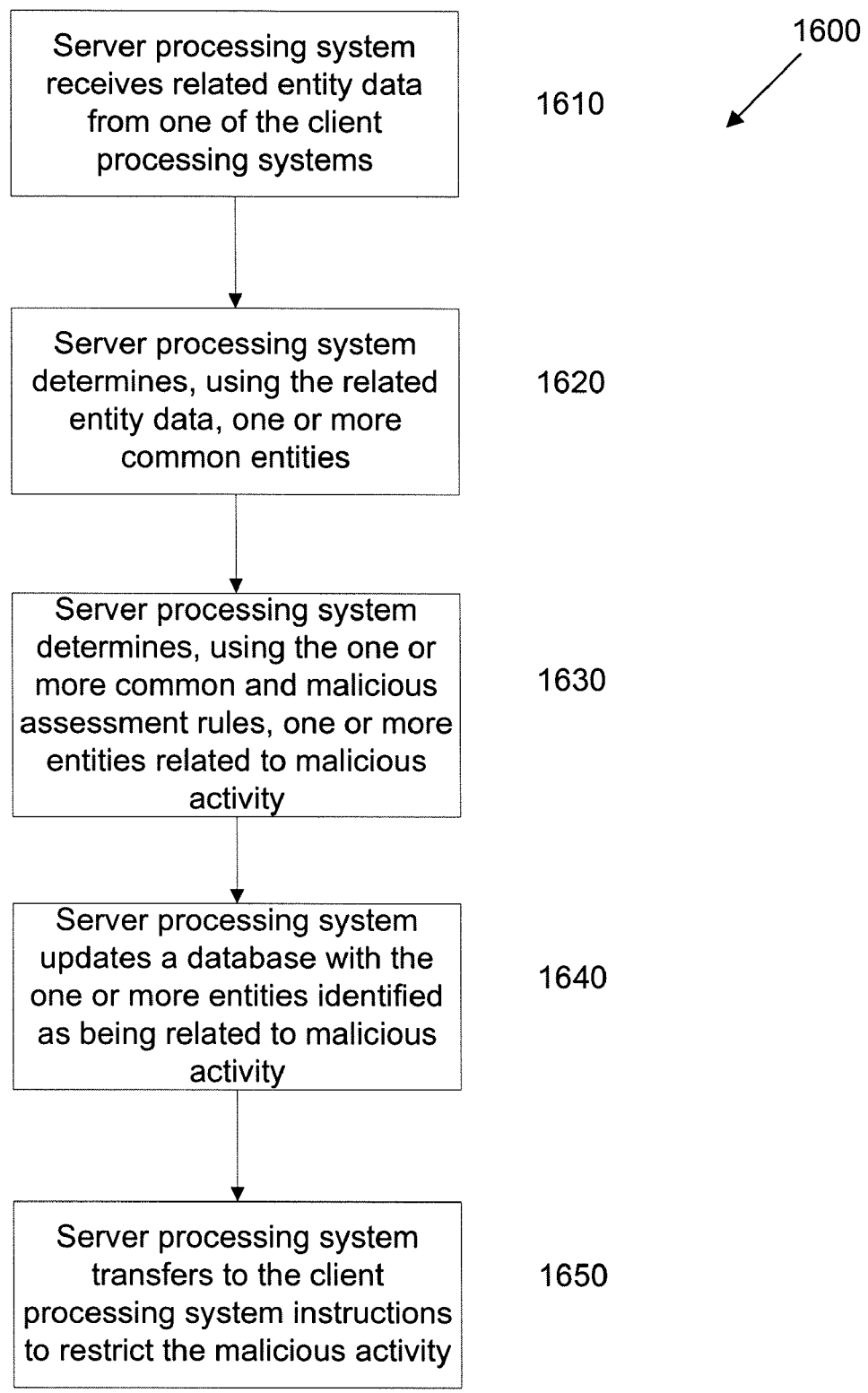
FIG. 16 illustrates a method of using a server side analysis module.

An example method of determining entities which are associated with malicious activity using a server-side analysis module will now be described with reference to FIG. 16.

At step 1610 the method 1600 comprises receiving, in the server processing system 840, related entity data indicative of the group of related entities 1330 from the client processing system 810. The related entity data may comprise measurements and or properties associated with each related entity in the group 1300, 1310, 1320. Additionally or alternatively, the related entity data may be the actual entities detected in the client processing system 810. The server processing system 840 may also receive a suspicion identifier indicative of a suspected behaviour associated with the suspicious entities. For example, the suspicious identifier may be indicative of the suspicious entities being associated with a pop-up window being displayed on the client processing system 810 at regular intervals. The related entity data may also comprise data indicating the starting entity 1300 in the group 1300, 1310, 1320. The related entity data may also be indicative of one or more relationships (direct or indirect) between entities of the group, similar to that of a linked list.

At step 1620, the server processing system 840 determines, using the related entity data, one or more common entities in relation to records received from other client processing systems 810. This step comprises determining if the related entity data received from one of the client processing systems 810 comprises one or more entities in common with other records of related entity data received from other client processing systems 810. If suspicion identifiers were received from the other client processing systems 810 in relation to the related entity data, the server processing system 840 may use the suspicion identifier to determine the common entities. By determining the common entities, the group of entities which may be malicious can be reduced and further significantly increases efficiency in determining the one or entities associated with the malicious activity 1770. Furthermore, this step provides an additional filter by reducing the number of false positives that need to be analysed.

At step 1630, the method 1600 comprises the server processing system 840 determining, using the one or more common entities and the server-side analysis module, one or more entities associated with malicious activity 1770. The server-side analysis module can comprise one or more of the sub-modules of the client processing system analysis module 1000. Furthermore, the server-side analysis module can comprise a set of malicious assessment rules. The malicious assessment rules can be a more complex set of rules compared to the filter module 1000 to determine the entities of interest.

The malicious assessment rules can be used to determine a level of maliciousness for the common related entities. If the level of maliciousness is determined to satisfy a particular criteria, such as exceeding a maximum limit, then at least some of the common related entities are identified as being associated with malicious activity 1770.

In one form, if a common entity satisfies a particular malicious assessment rule, the common entity is associated with a value or weight indicating how malicious the entity is considered. If the same common entity satisfies a number of particular malicious assessment rules, the values or weights associated with the entity are totalled. The total value or weight can be compared to a maximum limit to determine whether the common related entity is associated with malicious activity 1770.

The malicious assessment rules are generally considered to be a stricter set of rules in order to filter the common related entities. As the malicious assessment rules are generally more complex and considered more complete than the rules of the filter module 1000, a number of the entities which were of interest may not necessarily satisfy the malicious assessment rules and are therefore not identified as being associated with malicious activity 1770. For example, a legitimate printer driver may have been identified as related to an entity of interest and was also identified as a common entity due to a particular type of malware using the printer driver to perform malicious activities. However, after the malicious assessment rules have been applied, the printer driver is determined to not be part of the malicious activity 1770. The remaining common entities which satisfy the malicious assessment rules are identified as being associated with malicious activity 1770 in the client processing system 810.

At step 1640, the method comprises the server processing system 840 recording in a database the one or more entities 1330 which were identified as being associated with malicious activity in step 1630. This process is particularly useful for early detection of new or modified malware, so that instructions can be generated as early as possible to quarantine the identified entities 1330 associated with malicious activity 1770 in the client processing system 810.

Optionally, at step 1650, the method comprises transferring from the server processing system 840 to at least one of the client processing systems 810 instructions to restrict the malicious activity 1770. In one form, this may comprise quarantining the identified entities 1330 associated with the malicious activity 1770 in one of the client processing systems 810. The instructions may be computer executable instructions which can be transferred from the server processing system 840 to one of the client processing systems 810 which can be executed to quarantine the one or more entities 1330 identified as being associated with malicious activity 1770. In one embodiment, quarantining the one or more entities 1330 identified as being associated with the malicious activity 1770 may comprise removing the one or more identified entities 1330 from the client processing system 810. In another embodiment, quarantining the one or more identified entities may comprise modifying the one or more entities 1330 in the one or more client processing systems 1770. In an additional or alternate form, the modification of the one or more identified entities 1330 may comprise injecting executable instructions in the one or more identified entities, or associated entities, in order to at least partially disable the malicious activity 1770.

Optionally, the one or more client processing systems 810 may receive, one or more updated filter rules and/or related entity rules. The one or more client processing systems 810 may receive updated rules from the server processing system 840 or via a data store such as a compact disk or the like. The one or more client processing systems 810 can then update the existing rules with the updated rules.

In one form, statistical processes, fuzzy logic processes and/or heuristical processes can be used in combination with filter rules, the related entity rules and/or the malicious assessment rules to determine whether a rule has been satisfied. In some forms, a user of a processing system can modify one or more parameters of the above processes in order to configure the detection of the one or more related entities which are associated with the malicious activity 1770 and therefore provide a more highly accurate outcome.

Optionally, the related entities 1300, 1310, 1320 can be presented to a user of one of the client processing systems. The group of related entities 1300, 1310, 1320 may be presented in a tabular form or may be presented in a graphical representation. Additionally, the group of related entities 1300, 1310, 1320 may presented indicating direct or indirect links between entities in the group 1300, 1310, 1320. For example, 'Spywarz.exe' and 'Spywarz.dll' for the above example would have a direct link. However, if a subsequent related entity to 'Spywarz.dll' was determined to be a system variable 'SPYWARZ_VARIABLE', then there would be an indirect link between 'Spywarz.exe' and 'SPYWARZ_VARIABLE'.

It will be appreciated that although in some of the above examples the server processing system 840 generates the instructions to quarantine the entities 1330 associated with the malicious activity 1770, the one or more client processing systems 840 may alternatively generate the instructions.

Additionally or alternatively, different weighting values may be assigned to different malicious assessment rules. The weighting values may be summed or used in a calculation, and if the result is above a maximum limit, then at least some of the group 1330 is determined to be associated with malicious activity 1770.

It is noted that an activity 230 which is suspicious 1750 is not always identified as being associated with malicious activity 1770.

The related entity rules are generally less complex (such as a reduced number of rules) compared to the malicious assessment rules in order to reduce the processing performed by the client processing systems 840. The malicious assessment rules can be used by the server processing system to determine which related entities 1300, 1310, 1320 are associated with malicious activity. By using this configuration, the server processing system preferably performs the processing related to determining the entities 1330 associated with the malicious activity 1770, and thus the client processing systems 810 can utilise the processing system resources more effectively.

The embodiments discussed may be implemented separately or in any combination as a software package or component. Such software can then be used to pro-actively notify, restrict, and/or prevent malicious activity being performed. Various embodiments can be implemented for use with the Microsoft Windows operating system or any other modern operating system.

In one optional form, although four types of filter lists 1010, 1020, 1030, 1040 have been herein described for the filter module 1000, these filter lists 1010, 1020, 1030, 1040 can be used separately or in combination.

In one optional form, such software may be invoked during the start-up process of the processing system 100. Alternatively, the user may invoke the software via the operating system of the processing system 100.

It will be appreciated that the analysis of the identified suspicious activity 1750 does not necessarily need to be performed in real time. Thus, once a suspicious activity 1750 has been identified, the target entity 220, the requesting entity 210 and the activity 230 is recorded and can be later analysed using the analysis module 1200. However, in another form, the analysis of the suspicious activity 1750 can be performed in real time. The results of the analysis can be used to determine whether the activity 230 is performed in relation to the target entity 220.

In another optional form, the user may be prompted regarding the identification of malicious activity 1770, wherein the user can determine whether the malicious activity 1770 should be allowed to be performed, or whether the activity should be denied.

In another optional form, the user may define user defined filter rules. For example, there may be an activity 230 is the client processing system 810 which is being analysed by the analysis module 1200. However, the user is aware that the activity 230 is not associated with malicious activity 1770. As such, the user is able to define a user defined rule such as to prevent the activity 230 being analysed by the analysis module 1200. In one form, user defined filter rules are positioned at the start of the list of filter rules, such that the user defined filter rules are applied first prior to the remaining filter rules.

In another optional form, the analysis module 1200 may comprise as activity sequence sub-module which analyses a sequence of activities that occurred prior to an after an identified suspicious activity in a processing system 100. The system may comprise an activity recordal module which records each intercepted event in the processing system 100. When the filter module 1000 identifies an activity which is suspicious, activities which occurred prior to and after the identified suspicious activity can be analysed using the activity sequence sub-module module to determine whether a sequence of activities are indicative of a particular behaviour associated with malware.

Modules and sub-modules may be implemented using hardware, software, or a combination of both.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A computer-implemented method to detect malicious activity, wherein the method comprises:
   transmitting filter feedback data to a server processing system, the filter feedback data indicative of a frequency that one or more filter rules have previously been satisfied, wherein the one or more filter rules comprise information identifying one or more requesting entities and one or more target entities;
   receiving, from the server processing system, order data, the order data indicative of an order of the filter rules in a list of filter rules, wherein an overall frequency is calculated for a filter rule, wherein a weight factor is applied to calculate the overall frequency for the filter rule, wherein the weight factor is based on how recently the filter rule was satisfied;
   intercepting, by a hardware processor, an activity in a processing system, wherein a requesting entity requests the activity to be performed in relation to a target entity;
   determining the identity of the requesting entity that requests the activity and the identity of the target entity;
   determining, using a filter module, if the activity is suspicious or non-suspicious by comparing at least the identity of the requesting entity and the identity of the target entity with the information within the filter rules that identifies the one or more requesting entities and the one or more target entities, wherein the filter module comprises the list of filter rules; and
   in response to determining that the activity is suspicious, analyzing, by the processor, the activity, the requesting entity and the target entity using an analysis module to detect malicious activity.

2. The method according to claim 1, wherein the filter module filters the activity according to the requesting entity and the target entity to determine if the activity is suspicious or non-suspicious.

3. The method according to claim 1, wherein the filter module comprises at least one of:
   a list of susceptible target entity filter rules, wherein the step of determining if the activity is suspicious comprises determining if the target entity satisfies one of the susceptible target entity filter rules, and in response to one of the susceptible target entity filter rules being satisfied, the activity is identified as being suspicious; and
   a list of non-susceptible target entity filter rules, wherein the step of determining if the activity is non-suspicious comprises determining if the target entity satisfies one of the non-susceptible target entity filter rules, and in response to one of the non-susceptible target entity filter rules being satisfied, the activity is identified as being non-suspicious;
   a list of non-trusted requesting entity filter rules, wherein the step of determining if the activity is suspicious comprises determining if the requesting entity satisfies one of the non-trusted requesting entity filter rules, and in response to one of the non-trusted requesting entity filter rules being satisfied, the activity is identified as being suspicious; and
   a list of trusted requesting entity filter rules, wherein the step of determining if the activity is non-suspicious comprises determining if the requesting entity satisfies one of the non-trusted requesting entity filter rules, and in response to one of the non-trusted requesting entity filter rules being satisfied, the activity is identified as being non-suspicious.

4. The method according to claim 1, wherein the analysis module comprises a list of activity sequences indicative of malicious activity, wherein analysing the suspicious activity comprises comparing the suspicious activity and at least one of activities which occurred prior to the suspicious activity and activities which occurred after the suspicious activity to the list of activity sequences, wherein in response to a positive comparison, the activity is determined to be associated with malicious activity.

5. The method according to claim 1, wherein the filter module comprises a list of filter rules to determine if at least one of the target entity and the requesting entity are suspicious or non-suspicious, wherein the method comprises determining an order of the list based at least partially according to a frequency of instances each filter rule has been previously satisfied, wherein the list of filter rules are used in accordance with the order.

6. A processing system configured to detect malicious activity, the processing system comprising:
   a processor;
   memory in electronic communication with the processor;
   the processor configured to transmit filter feedback data to a server processing system, the filter feedback data indicative of a frequency that one or more filter rules have previously been satisfied, wherein the one or more filter rules comprise information identifying one or more requesting entities and one or more target entities;
   the processor configured to receive, from the server processing system, order data, the order data indicative of an order of the filter rules in a list of filter rules, wherein an overall frequency is calculated for a filter rule, wherein a weight factor is applied to calculate the overall frequency for the filter rule, wherein the weight factor is based on how recently the filter rule was satisfied;
   the processor configured to intercept an activity in the processing system, wherein a requesting entity requests the activity to be performed in relation to a target entity;
   the processor configured to determine the identity of the requesting entity that requests the activity and the identity of the target entity;
   a filter module stored in the memory, the filter module configured to determine if the activity is suspicious or non-suspicious by comparing at least the identity of the requesting entity and the identity of the target entity with the information within the filter rules that identifies the one or more requesting entities and the one or more target entities, wherein the filter module comprises the list of filter rules; and
   an analysis module stored in the memory, the analysis module configured to, in response to determining that the activity is suspicious, analyse the activity, the requesting entity and the target entity using an analysis module to detect malicious activity.

7. The system according to claim 6, wherein the filter module filters the activity according to the requesting entity and the target entity to determine if the activity is suspicious or non-suspicious.

8. The system according to claim 6, wherein the filter module comprises at least one of:
   a list of susceptible target entity filter rules, wherein the step of determining if the activity is suspicious comprises determining if the target entity satisfies one of the susceptible target entity filter rules, and in response to one of the susceptible target entity filter rules being satisfied, the activity is identified as being suspicious; and a list of non-susceptible target entity filter rules, wherein the step of determining if the activity is non-suspicious comprises determining if the target entity satisfies one of the non-susceptible target entity filter rules, and in response to one of the non-susceptible target entity filter rules being satisfied, the activity is identified as being non-suspicious;

a list of non-trusted requesting entity filter rules, wherein the step of determining if the activity is suspicious comprises determining if the requesting entity satisfies one of the non-trusted requesting entity filter rules, and in response to one of the non-trusted requesting entity filter rules being satisfied, the activity is identified as being suspicious; and a list of trusted requesting entity filter rules, wherein the step of determining if the activity is non-suspicious comprises determining if the requesting entity satisfies one of the non-trusted requesting entity filter rules, and in response to one of the non-trusted requesting entity filter rules being satisfied, the activity is identified as being non-suspicious.

9. The system according to claim 6, wherein the analysis module comprises a list of activity sequences indicative of malicious activity, wherein analysing the suspicious activity comprises comparing the suspicious activity and at least one of activities which occurred prior to the suspicious activity and activities which occurred after the suspicious activity to the list of activity sequences, wherein in response to a positive comparison, the activity is determined to be associated with malicious activity.

10. The system according to claim 6, wherein the filter module comprises a list of filter rules to determine if at least one of the target entity and the requesting entity are suspicious or non-suspicious, wherein the system is configured to determine an order of the list based at least partially according to a frequency of instances each filter rule has been previously satisfied.

11. A computer program product for a processing system, the computer program product comprising a non-transitory computer readable medium having a computer program recorded therein or thereon, the computer program enabling the detection of malicious activity, wherein the computer program product configures the processing system to:

transmit filter feedback data to a server processing system, the filter feedback data indicative of a frequency that one or more filter rules have previously been satisfied, wherein the one or more filter rules comprise information identifying one or more requesting entities and one or more target entities;

receive, from the server processing system, order data, the order data indicative of an order of the filter rules in a list of filter rules, wherein an overall frequency is calculated for a filter rule, wherein a weight factor is applied to calculate the overall frequency for the filter rule, wherein the weight factor is based on how recently the filter rule was satisfied;

intercept an activity in a processing system, wherein a requesting entity requests the activity to be performed in relation to a target entity;

determine the identity of the requesting entity that requests the activity and the identity of the target entity;

determine, using a filter module if the activity is suspicious or non-suspicious by comparing at least the identity of the requesting entity and the identity of the target entity with the information within the filter rules that identifies the one or more requesting entities and the one or more target entities, wherein the filter module comprises the list of filter rules; and in response to determining that the activity is suspicious, analyse the activity, the requesting entity and the target entity using an analysis module to detect malicious activity.

12. A computer-implemented method to facilitate detection of suspicious entities in, or interacting with, a processing system, the method being performed in a server processing system, the server processing system being in data communication with the processing system, wherein the method comprises:

receiving, by the server processing system, filter feedback data from the processing system, the filter feedback data indicative of a frequency that one or more filter rules have previously been satisfied, wherein the one or more filter rules comprise information identifying one or more requesting entities and one or more target entities;

determining, by a hardware processor, an order of a list of filter rules based on the received filter feedback data, wherein each filter rule has an associated filter rating at least partially indicative of a frequency of instances that each filter rule has been previously satisfied in identifying suspicious or non-suspicious entities for the processing system, and wherein determining the order of the list of filter rules is performed at least partially based in accordance with the filter rating for each filter rule in the list, such that use of the filter rules to detect the suspicious entity is performed in accordance with the order, wherein a weight factor is applied to calculate the filter rating for each filter rule, wherein the weight factor is based on how recently each filter rule was satisfied; and transferring to the processing system order data, the order data indicative of the order of the filter rules in the list of filter rules, wherein the filter rules are used by the processing system to determine if an activity is suspicious or non-suspicious by comparing at least the identity of a requesting entity and the identity of a target entity with the information within the filter rules that identifies the one or more requesting entities and the one or more target entities.

13. The method according to claim 12, wherein the method comprises generating the filter rating for each filter rule based at least partially on the frequency of instances that each filter rule has been satisfied.

14. The method according to claim 13, wherein the method comprises generating the filter rating for each filter rule for over a selected period of time.

15. The method according to claim 13, wherein the step of generating the filter rating for each filter rule comprises weighting each filter rating according to a recentness of the filter rule being satisfied.

16. A server processing system to facilitate detection of suspicious entities in, or interacting with, a processing system, the server processing system being in data communication with the processing system, wherein the server processing system comprises:

a processor;

memory in electronic communication with the processor;

the processor configured to receive filter feedback data from the processing system, the filter feedback data indicative of a frequency that one or more filter rules have previously been satisfied, wherein the one or more filter rules comprise information identifying one or more requesting entities and one or more target entities;

the processor configured to determine an order of a list of filter rules, wherein each filter rule has an associated filter rating at least partially indicative of a frequency of instances that each filter rule has been previously satisfied in identifying suspicious or non-suspicious entities for the processing system, and wherein determining the order of the list of filter rules is performed at least partially in accordance with the filter rating for each filter rule in the list such that use of the filter rules to detect the suspicious entity is performed in accordance with the determined order, wherein a weight factor is applied to calculate the filter rating for each filter rule, wherein the weight factor is based on how recently each filter rule was satisfied; and the processor configured to transfer to the processing system order data, the order data indicative of the order of the filter rules in the list of filter rules, wherein the filter rules are used by the processing system to determine if an activity is suspicious or non-suspicious by comparing at least the identity of a requesting entity and the identity of a target entity with the information within the filter rules that identifies the one or more requesting entities and the one or more target entities.

17. The system according to claim 16, wherein the system is configured to generate the filter rating for each filter rule based at least partially on the frequency of instances that each filter rule has been satisfied.

18. The system according to claim 17, wherein the system is configured to generate the filter rating for each filter rule for over a selected period of time.

19. The system according to claim 18, wherein the filter rating for each filter rule is weighted for each filter rating according to a recentness of the filter rule being satisfied.

20. A computer program product comprising a non-transitory computer readable medium having a computer program recorded therein or thereon, the computer program being configured to facilitate detection of suspicious entities in, or interacting with, a processing system, wherein the computer program product configures a server processing system to:

receive filter feedback data from the processing system, the filter feedback data indicative of a frequency that one or more filter rules have previously been satisfied, wherein the one or more filter rules comprise information identifying one or more requesting entities and one or more target entities, the server processing system being in data communication with the processing system;

determine an order of a list of filter rules based on the received filter feedback data, wherein each filter rule has an associated filter rating at least partially indicative of a frequency of instances that each filter rule has been previously satisfied in identifying suspicious or non-suspicious entities for the processing system, and wherein determining the ordering of the list of filter rules is performed at least partially in accordance with the filter rating for each filter rule in the list such that use of the filter rules to detect the suspicious entity is performed in accordance with the determined order, wherein a weight factor is applied to calculate the filter rating for each filter rule, wherein the weight factor is based on how recently each filter rule was satisfied; and transfer to the processing system order data, the order data indicative of the order of the filter rules in the list of filter rules, wherein the filter rules are used by the processing system to determine if an activity is suspicious or non-suspicious by comparing at least the identity of a requesting entity and the identity of a target entity with the information within the filter rules that identifies the one or more requesting entities and the one or more target entities.

* * * * *